United States Patent
Tsujii et al.

(10) Patent No.: US 10,882,962 B2
(45) Date of Patent: Jan. 5, 2021

(54) SRT MATERIAL, COMPOSITE AND METHOD FOR PRODUCING THE SAME

(71) Applicant: KYOTO UNIVERSITY, Kyoto (JP)

(72) Inventors: Yoshinobu Tsujii, Kyoto (JP); Keita Sakakibara, Kyoto (JP); Yoshihiko Shimizu, Kyoto (JP); Hiroshi Watanabe, Kyoto (JP); Takaya Sato, Yamagata (JP); Ken Nakano, Yokohama (JP); Hitoshi Hattori, Yokohama (JP)

(73) Assignee: KYOTO UNIVERSITY, Kyoto (JP)

( * ) Notice: Subject to any disclaimer, the term of this patent is extended or adjusted under 35 U.S.C. 154(b) by 84 days.

(21) Appl. No.: 16/145,604

(22) Filed: Sep. 28, 2018

(65) Prior Publication Data

US 2019/0100631 A1    Apr. 4, 2019

(30) Foreign Application Priority Data

Sep. 29, 2017 (JP) .................. 2017-191499

(51) Int. Cl.
    *C08J 3/075* (2006.01)
    *C08J 5/18* (2006.01)
    (Continued)

(52) U.S. Cl.
    CPC ............... *C08J 3/075* (2013.01); *C08B 1/00* (2013.01); *C08B 3/14* (2013.01); *C08F 220/22* (2013.01); *C08F 251/02* (2013.01); *C08G 83/00* (2013.01); *C08J 5/18* (2013.01); *C08L 1/02* (2013.01); *C08L 1/10* (2013.01); *C08L 89/06* (2013.01); *C10M 119/12* (2013.01); *C10M 145/40* (2013.01); *C10M 169/041* (2013.01); *C10M 171/00* (2013.01); *C08F 2438/01* (2013.01); *C08J 2351/02* (2013.01); *C10M 2209/0845* (2013.01); *C10M 2209/104* (2013.01); *C10M 2209/109* (2013.01); *C10M 2209/12* (2013.01); *C10N 2020/04* (2013.01);
    (Continued)

(58) Field of Classification Search
    CPC .......... C08J 3/075; C08J 2351/02; C08J 5/18; C08B 3/14; C08B 1/00; C08L 1/02; C08L 89/06; C08L 1/10; C08G 83/00; C10M 145/40; C10M 169/041; C10M 119/12; C10M 2209/104; C10M 2209/109; C10M 2209/0845; C10M 2209/12; C10M 171/00; C10N 2220/086; C10N 2250/14; C10N 2220/021; C10N 2230/06; C08F 2438/01; C08F 220/22; C08F 251/02
    See application file for complete search history.

(56) References Cited

U.S. PATENT DOCUMENTS

2014/0066343 A1* 3/2014 Bielecki ............... C09D 133/08
508/103

FOREIGN PATENT DOCUMENTS

JP    2006316169 A    11/2006
JP    201256165 A *    3/2012
(Continued)

*Primary Examiner* — Taiwo Oladapo
(74) *Attorney, Agent, or Firm* — Browdy and Neimark, PLLC

(57) ABSTRACT

Using an organic compound having a bottle brush structure, a material having softness and resilience and having excellent low-friction performance (SRT material) can be provided. Preferably, the SRT material contains a reinforcing filler, and may contain a lubricating liquid to be gelled.

20 Claims, 5 Drawing Sheets

(51) Int. Cl.
  *C08F 251/02*  (2006.01)
  *C08G 83/00*  (2006.01)
  *C10M 145/40*  (2006.01)
  *C10M 169/04*  (2006.01)
  *C10M 119/12*  (2006.01)
  *C08F 220/22*  (2006.01)
  *C08B 3/14*  (2006.01)
  *C10M 171/00*  (2006.01)
  *C08L 1/02*  (2006.01)
  *C08B 1/00*  (2006.01)
  *C08L 89/06*  (2006.01)
  *C08L 1/10*  (2006.01)
  *C10N 20/04*  (2006.01)
  *C10N 20/00*  (2006.01)
  *C10N 30/06*  (2006.01)
  *C10N 50/00*  (2006.01)

(52) U.S. Cl.
  CPC .... *C10N 2020/063* (2020.05); *C10N 2030/06* (2013.01); *C10N 2050/023* (2020.05)

(56) References Cited

FOREIGN PATENT DOCUMENTS

| | | | | |
|---|---|---|---|---|
| JP | 2014169787 | A | * | 9/2014 |
| JP | 2014169787 | A | | 9/2014 |

* cited by examiner (1) POLYMERIZATION INITIATOR GROUP INTRODUCING STEP (2) INITIATOR GROUP-CONTAINING COMPOSITE GEL PRODUCTION STEP (3) STEP OF INTRODUCING SIDE CHAINS AND CONCENTRATED POLYMER BRUSHES

SRT MATERIAL, COMPOSITE AND METHOD FOR PRODUCING THE SAME

RELATED APPLICATION

This application claims foreign priority of Japanese Patent Application No. 2017-191499, filed Sep. 29, 2017, which is incorporated by reference in its entirety.

1. FIELD OF THE INVENTION

The present invention relates to an SRT material and a composite having an excellent friction reducing effect.

2. BACKGROUND ART

Machine products that are closer to daily life, such as compressors of air conditioner or speakers, have "moving parts" that move in combination of parts, and owing to the friction occurring therein, energy is lost in many cases. For reducing the friction to occur in such moving parts, heretofore, various researches and developments centered mainly in a field of machine engineering have been promoted. However, the friction reduction dealt with in a field of machine engineering mostly depends on a metalworking technique of, for example, polishing the surface of a part, and is therefore problematic in that it requires a high-level skill of technical prowess and takes a lot of trouble and much time and needs much capital investment.

Given the situation, a low-friction material that utilizes flexibility and lubricity of a polymer chain layer grown at a high density from the surface of a substrate according to a grafting-from method has been proposed. The low-friction polymer material does not almost depend on any high-level metalworking technique, and can therefore bring about production cost reduction for various machine products, and in addition, further prolongation of lifetime, reduction in size and weight and reduction in noise generation in machine products can be expected.

Regarding such low-friction materials, PTL 1 describes production of a lubricant that contains a surface having a graft-grown polymer chain in a high density (CPB). The lubricant expresses low-friction performance when the thickness of the polymer chain layer therein is in an order of 10 to 100 nm, and is effective for slide members that require a submicron or nano-order smoothness.

PTL 2 describes a slide member in which a polymer graft chain layer containing an ionic liquid structure is formed on the slide surface thereof. The slide member is a low-friction slide member having a friction-reducing effect between slide surfaces, and the effect thereof lasts long.

CITATION LIST

Patent Literature

PTL 1: JP-A-2006-316169
PTL 2: JP-A-2014-169787

SUMMARY OF INVENTION

Technical Problem

As described above, PTLs 1 and 2 propose use of a polymer chain layer grown in a high density according to a grafting-from method as a low-friction material. The present inventors have actually tested the low-friction material as a slide member in an actual machine device and evaluated the performance thereof and, as a result, have found that, under actual use conditions where foreign substance may readily penetrate thereinto, the polymer chain layer is readily peeled off by the relatively large foreign substance having penetrated into the sliding mechanism in the device and the low-friction effect of the material is thereby reduced. Consequently, the inventors have reached a thought that development of a low-friction polymer material having both flexibility and resiliency enough to attain high durability under such use conditions is necessary.

Given the situation, for solving the problems in such already-existing techniques, the present inventors have further promoted investigations for providing a material (SRT material) having both flexibility and resiliency and having excellent low-friction performance.

Solution to Problem

As a result of assiduous studies made for the purpose of solving the above-mentioned problems, the present inventors have found that, among polymers, a polymer having a bottle brush structure is an important substance for realizing excellent low-friction characteristics and mechanical characteristics. The present invention has been made on the basis of such a finding, and specifically includes the following constitutions.

[1] An SRT material containing an organic compound having a bottle brush structure.
[2] The SRT material according to [1], containing, as a second component, any one or more of fibrous materials, nonporous inorganic materials and substances having a three-dimensional polymer network structure.
[3] The SRT material according to [2], satisfying at least one of the following (1) and (2):
 (1) the organic compounds having a bottle brush structure bond to each other via a covalent bond, an ionic bond, a hydrogen bond, a hydrophilic-lipophilic interaction or a phase separation structure,
 (2) the organic compound having a bottle brush structure and the second component bond to each other via a covalent bond, an ionic bond, a hydrogen bond, a hydrophilic-lipophilic interaction or a phase separation structure.
[4] The SRT material according to any one of [1] to [3], wherein the effective surface occupancy of the bottle brush structure is 1% or more.
[5] The SRT material according to any one of [1] to [4], containing the organic compound having a bottle brush structure in an amount of 10% by weight or more.
[6] The SRT material according to any one of [1] to [5], containing a lubricating liquid.
[7] The SRT material according to any one of [1] to [6], wherein the indentation is 100 nm or more and the compressive elasticity modulus is 1 MPa or more.
[8] The SRT material according to any one of [1] to [7], wherein the frictional coefficient (μ) is 0.1 or less.
[9] The SRT material according to any one of [1] to [8], which is in the form of a sheet.
[10] The SRT material according to any one of [1] to [9], which is for sliding mechanisms.
[11] A composite of an organic compound having a bottle brush structure and a reinforcing filler.
[12] The composite according to [11], wherein the reinforcing filler is a cellulose nanofiber.
[13] The composite according to [11] or [12], satisfying at least one of the following (1) and (2):

(1) the organic compounds having a bottle brush structure bond to each other via a covalent bond, an ionic bond, a hydrogen bond, a hydrophilic-lipophilic interaction or a phase separation structure, (2) the organic compound having a bottle brush structure and the reinforcing filler bond to each other via a covalent bond, an ionic bond, a hydrogen bond, a hydrophilic-lipophilic interaction or a phase separation structure.

[14] The composite according to any one of [11] to [13], wherein the effective surface occupancy of the bottle brush structure is 1% or more.

[15] A method for producing a composite of a bottle brush and a reinforcing filler, including graft polymerization using a mixture of a polymer having a recurring unit having a polymerization initiator group and a reinforcing filler.

[16] The method for producing a composite according to [15], wherein the mixture is one prepared through polymerization of a monomer having a polymerization initiator group and a reinforcing filler.

[17] The method for producing a composite according to [15] or [16], wherein the reinforcing filler in the mixture has a fiber network structure and the fiber network structure is maintained after the polymerization.

[18] The method for producing a composite according to [17], wherein the reinforcing filler in the mixture is a cellulose nanofiber of a cellulose gel, and network of the cellulose nanofiber of the cellulose gel is maintained after the polymerization.

[19] A composite produced according to the production method of any one of [15] to [18].

[20] An SRT material containing the composite of [19]

Advantageous Effects of Invention

The SRT material of the present invention has flexibility and resilience and has a high friction-reducing effect. Accordingly, the SRT material can be effectively used for members of sliding mechanisms of various machine devices.

DESCRIPTION OF EMBODIMENTS

In the following, the present invention is described in detail. The description of the constitutive elements of the invention given hereinunder is for some typical embodiments and examples of the invention, to which, however, the invention should not be limited. In this description, the numerical range expressed by the wording "a number to another number" means the range that falls between the former number indicating the lower limit of the range and the latter number indicating the upper limit thereof. Also, the terms "(meth)acrylate", "(meth)acrylic acid" and "(meth)acryloyl" each mean both acrylate and methacrylate, both acrylic acid and methacrylic acid, and both acryloyl and methacryloyl, respectively.

<SRT Material>

The SRT material of the present invention is characterized by containing an organic compound having a bottle brush structure.

The "SRT material" is a low-friction material having both softness and resiliency (a soft and resilient tribo-material", and, for example, has dense polymer chains, and a material in which the polymer chains contribute toward low-friction performance may correspond to the "SRT material". Here, the word "polymer chains" means a structure that constitutes at least a part of a polymer in which plural structural units (recurring units) thereof bond to each other linearly.

Figure 1:
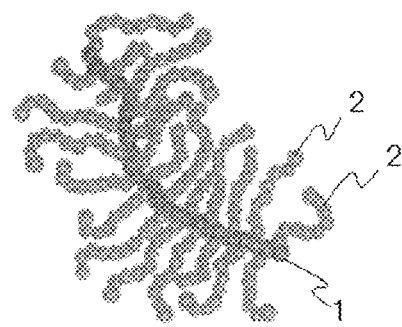
FIG. 1 is a schematic view for explaining a bottle brush structure.

The "bottle brush structure" in the present invention is a branched polymer structure, for example, as shown in FIG. 1 in which plural polymer chains (side chains) 2 are branched from a main chain 1 to form a bottle brush-like configuration as a whole. The SRT material of the present invention contains an organic compound having such a bottle brush structure, and therefore has soft and resilient properties and can exhibit excellent low-friction performance. FIG. 1 schematically shows a bottle brush structure, and the bottle brush structure usable in the present invention is not limited to the structure shown in FIG. 1.

In the following, an organic compound having a bottle brush structure that the SRT material contains, and other components that may be optionally contained in the material are described.

[Organic Compound Having Bottle Brush Structure]

An organic compound having a bottle brush structure has a branched polymer structure in which plural side chains are branched from a liner main chain, as described above, and the main chain and the side chains each are composed of a plurality of recurring units each containing at least a carbon atom and a hydrogen atom and bonding to each other.

Here, the main chain may have a linear structure or a crosslinked structure, but preferably has a crosslinked structure. With that, the SRT material may have high resiliency and may have improved durability to friction.

The number-average polymerization degree of the main chain (in a crosslinked polymer, the crosslinking is virtually cut to give a primary chain as the main chain thereof) is preferably 10 to 10,000, more preferably 10 to 1,000, even more preferably 10 to 100. When the number-average polymerization degree of the main chain falls within the above range, the SRT material may have suitable mechanical characteristics.

Regarding the number-average polymerization degree of the main chain, the number-average molecular weight of the main chain precursor before introduction of side chains thereinto (in a crosslinked polymer, the equivalent primary chain precursor obtained before addition of the crosslinking agent thereto) is measured, and the thus-measured number-average molecular weight is divided by the molecular weight of the monomer unit to be the number-average polymerization degree of the main chain.

The side chains may be linear or may have a branched structure or a crosslinked structure. The number-average polymerization degree of the side chains is preferably 1 to 100, more preferably 1 to 50, even more preferably 5 to 20. When the number-average polymerization degree of the side chains falls within the above range, the SRT material can exhibit excellent softness, low friction performance and lubricity owing to the concentrated polymer brush effect thereof.

Regarding the number-average polymerization degree of the side chains, a small amount of a low-molecular initiator (for example, an organic compound having a halogen-substituted carbon group) is added to the reaction liquid in prolonging the side chains from the main chain in the process of synthesizing the organic compound having a bottle brush structure in order that a free polymer having a recurring structure common to the polymer chains of the side chains can be synthesized simultaneously with the chain extension reaction, and the number-average polymerization degree of the free polymer is measured to be the number-average polymerization degree of the side chains.

The number-average molecular weight of the entire organic compound including the main chain and the side chains is preferably 1,000 to 10,000,000, more preferably 1,000 to 1,000,000, even more preferably 5,000 to 500,000. When the number-average molecular weight of the organic compound falls within the above range, the SRT material can have excellent mechanical properties and low-friction performance, can be readily swollen with a liquid and can be excellent in handleability.

The number-average molecular weight of the main chain, the side chains and the entire organic compound may be derived from the molecular weight of a standard polymer sample of, polystyrene to be measured through gel permeation chromatography, or an absolute molecular weight to be measured using a multi-angle light-scattering device (MALS). In the present invention, the number-average molecular weight is a polystyrene standard polymer sample-equivalent molecular weight.

The density of the side chains branched from the main chain is, in terms of the number of the side chains per nm of the path length of the main chain (chains/nm), preferably 1 chain/nm or more, more preferably 2 chains/nm or more, even more preferably 3 chains/nm or more. When the density of the side chains falls within the above range, the SRT material can exhibit excellent softness, low-friction performance and lubricity.

Here, the density of the side chains can be determined from grafting efficiency.

The organic compound having a bottle brush structure is preferably a compound represented by the following general formula (1).

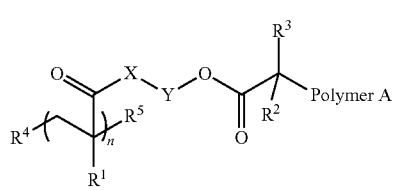
(1)

wherein $R^1$ and $R^2$ each independently represent a hydrogen atom or a methyl group; $R^3$ represents a substituent and is preferably an alkyl group having 1 to 10 carbon atoms; $R^4$ and $R^5$ each represent a terminal group of an atom or an atomic group, including a hydrogen atom, an azide group, a polymerization initiator group segment, a polymerization inhibitor group or the like; X represents O or NH; Y represents a divalent organic group; n represents an integer of 10 or more; and "Polymer A" represents a polymer chain. In the compound represented by the general formula (1), the recurring structure of the constituent unit parenthesized by n corresponds to the main chain of the bottle brush structure, and "Polymer A" corresponds to the side chain of the bottle brush structure. Here, "Polymer A" may be introduced in all the recurring units constituting the compound represented by the general formula (1), or may be introduced into only a part of the recurring units. In the case where "Polymer A" has been introduced into only a part of the recurring units constituting the compound represented by the general formula (1), the terminal of the side chain of the recurring unit not having "Polymer A" may be a hydrogen atom, or a polymerization initiator group may remain at the terminal, or the hydrogen atom or the polymerization initiator group may be substituted with any other atom or atomic group.

The organic group represented by Y includes an alkylene group having 1 to 18 carbon atoms, an oxyalkylene group having 1 to 18 carbon atoms (RO, where R represents an alkylene group having 1 to 18 carbon atoms), a connected structure of a plurality of such oxyalkylene groups connected to each other, a divalent organic group of a combination of at least two of these organic groups (the alkylene group having 1 to 18 carbon atoms, the oxyalkylene group having 1 to 10 carbon atoms and the connected structure of oxyalkylene groups) or the like. Here, the alkylene group and the alkylene group of the oxyalkylene group may be linear or branched, or may have a cyclic structure. Specific examples of the alkylene group include an ethylene group, a propylene group, a butylene group, and a cyclohexylene group. The alkylene group and the alkylene group of the oxyalkylene group may be substituted with a substituent. The substituent includes an alkyl group having 1 to 10 carbon atoms, an aryl group having 6 to 40 carbon atoms, and a heteroaryl group having 3 to 40 carbon atoms, and these substituents may be further substituted with a substituent.

Preferably, "Polymer A" has a constituent unit derived from a (meth)acrylic monomer. The (meth)acrylic monomer includes (cyclo)alkyl (meth)acrylates such as methyl (meth) acrylate, ethyl (meth)acrylate, propyl (meth)acrylate, isopropyl (meth)acrylate, n-butyl (meth)acrylate, 2-methylpropyl (meth)acrylate, t-butyl (meth)acrylate, pentyl (meth) acrylate, hexyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth)acrylate, cyclohexyl (meth)acrylate, t-butylcyclohexyl(meth)acrylate, isobornyl(meth)acrylate, trimethylcyclohexyl (meth)acrylate, cyclodecyl (meth)acrylate, cyclodecylmethyl (meth) acrylate, tricyclodecyl (meth)acrylate, benzyl (meth)acrylate, dicyclopentenyloxyethyl (meth)acrylate, and dicyclopentanyl (meth)acrylate; aryl (meth)acrylates such as phenyl (meth)acrylate, and naphthyl (meth)acrylate; alkenyl (meth)acrylates such as allyl (meth)acrylate; hydroxyl group-containing (meth)acrylates such as 2-hydroxyethyl (meth)acrylate, 2-hydroxypropyl (meth)acrylate, and (poly) ethylene glycol mono(meth)acrylate; glycol monoalkyl ether (meth)acrylates such as (poly)ethylene glycol monomethyl ether (meth)acrylate, (poly)ethylene glycol monoethyl ether (meth)acrylate, (poly)ethylene glycol monolauryl ether (meth)acrylate, and (poly)propylene glycol monomethyl ether (meth)acrylate; carboxyl group-containing (meth)acrylates such as (meth)acrylic acid, mono-2-((meth) acryloyloxy)ethyl phthalate, mono-2-((meth)acryloyloxy) ethyl succinate, mono-2-((meth)acryloyloxy)ethyl hexahydrophthalate, and mono-2-((meth)acryloyloxy)ethyl trimellitate; (meth)acrylates containing any other acid group than a carboxyl group, such as (meth)acryloyloxyethyl phosphates, and (meth)acryloyloxyethyl sulfonates; amino group-containing (meth)acrylates such as dimethylaminoethyl (meth)acrylate, diethylaminoethyl (meth)acrylate, and t-butylaminoethyl (meth)acrylate; quaternary ammonium base-containing (meth)acrylates such as chlorotrimethylammoniumethyl (meth)acrylate; isocyanate group-containing (meth)acrylates prepared by blocking the isocyanate group in (meth)acryloyloxyethyl isocyanate or 2-(2-isocyanatoethoxy)ethyl (meth)acrylate with s-caprolactone, methyl ethyl ketone oxime (MEK oxime) or pyrazole; cyclic (meth) acrylates such as tetrahydrofurfuryl (meth)acrylate; halogen-containing (meth)acrylates such as octafluorooctyl (meth)acrylate, and tetrafluoroethyl (meth)acrylate; UV-absorbing (meth)acrylates such as 2-(4-benzoxy-3-hydroxyphenoxy)ethyl (meth)acrylate, and 2-(2'-hydroxy-5-(meth) acryloyloxyethylphenyl)-2H-benzotriazole; and silicon-containing (meth)acrylates having a trimethoxysilyl group or a dimethylsilicone chain. Macromonomers prepared by introducing a (meth)acryl group into one terminal of oligomers produced through polymerization of these monomers may also be used here.

"Polymer A" may be a homopolymer, or may also be a copolymer having a random structure or a copolymer having a block structure.

The compound represented by the general formula (1) may be produced, for example, as follows. Starting from the carbon radical, as an active site, formed by removing Z from a polymer (initiator group-containing polymer) of the monomer represented by the following general formula (1'), a polymer chain is grown from that site according to a grafting-from process to give "Polymer A". Here, the polymer having the polymerization initiator group (Z) (that is, the polymer before introduction of "Polymer A" thereinto) may be referred to as an "initiator group-containing polymer", and the radical formed through the reaction at the polymerization initiator group may be referred to as an "active site".

General Formula (1')

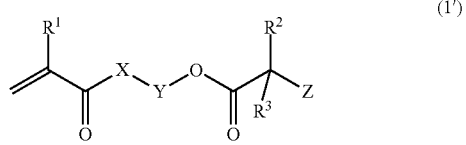

(1')

wherein $R^1$, $R^2$, $R^3$, X, Y, and n have the same meanings as $R^1$, $R^2$, $R^3$, X, Y, and n, respectively, in the general formula (1); and Z represents a halogen atom, and is preferably a bromine atom.

Regarding the structure of the polymer of the monomer represented by the general formula (1'), the description in the section of (Polymer) in <Method for Producing Composite> may be referred to.

The monomer represented by the general formula (1') may be synthesized through reaction of a hydroxyl group-having (meth)acrylate (hereinafter referred to as "a monomer (a)") and an acid component (hereinafter referred to as "an acid component (b)"

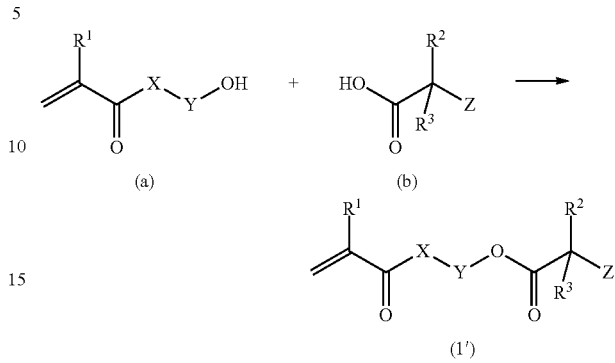

Among the monomers (a), those to form the compounds of the general formula (1') where X is O (hereinafter referred to as a "monomer (a1)") include, for example, 2-hydroxyethyl (meth)acrylate, 2-hydroxypropyl (meth)acrylate, 3-hydroxypropyl (meth)acrylate, 2,3-dihydroxypropyl (meth) acrylate, 2-hydroxy-3-chloropropyl (meth)acrylate, 4-hydroxybutyl (meth)acrylate, hydroycyclohexyl (meth) acrylate, polyethylene glycol mono(meth)acrylate, propylene glycol mono(meth)acrylate, and ethylene propylene glycol (meth)acrylate.

Among the monomers (a), those to form the compounds of the general formula (1') where X is NH include, for example, hydroxyethyl(meth)acrylamide; and monomers prepared through reaction of a (meth)acrylic acid or an acid halide such as a (meth)acrylic acid chloride and a compound having an amino group and having one or more hydroxyl groups.

Examples of the acid component (b) include 2-chloropropionic acid, 2-bromopropionic acid, 2-chloro-2-methyl-propionic acid, and 2-bromo-2-methyl-propionic acid. Acid halides and acid anhydrides thereof may also be used as the acid component (b).

The compounds having a bottle brush structure further include an initiator group-containing polymer obtained through reaction of a polymer of the above-mentioned monomer (a) and the acid component (b), or a hydroxyl group-terminated polyester-type monomer obtained through polymerization of ε-caprolactone or lactic acid using the above-mentioned monomer (a1); a hydroxyl group-containing monomer obtained through reaction of an organic compound having 2 or more hydroxyl groups or amino groups such as ethylene glycol or aminoethanol, and a monoester obtained through reaction of the previous hydroxyl group-containing monomer and a polybasic acid such as phthalic acid, at the other carboxyl group of the monoester; a hydroxyl group-containing monomer obtained through reaction of an epoxy group-containing monomer such as glycidyl (meth)acrylate and an organic compound having a carboxyl group followed by ring cleavage of the epoxy group of the resultant product; and a polymer obtained through reaction of a hydroxyl group-containing monomer or a polymer thereof obtained through reaction of an isocyanate such as isocyanatomethyl (meth)acrylate and an organic compound having 2 or more hydroxyl groups or 2 or more hydroxyl groups and amino groups, with the above-mentioned acid component (b) followed by grafting reaction of the resultant initiator group-containing polymer at the active site according to a grating-from process to introduce "Polymer A" thereinto.

The bottle brush structure-having compounds further include a polymer obtained through copolymerization of a monomer represented by the general formula (1') or a monomer obtained through reaction of any other hydroxyl group-containing monomer and an acid component (b), with a monomer different from these to give an initiator group-containing polymer, followed by grafting the resultant polymer at the active site thereof according to a grafting-from process to introduce "Polymer A" thereinto. As the other monomer than the previous ones, a radical-polymerizing, unsaturated bond-having monomer may be used, and examples thereof include (meth)acrylic acids, (meth)acrylate monomers, styrenic vinyl monomers, amide monomers, vinyl alkanoate monomers, and maleic monomers.

In addition, as the bottle brush structure-having compounds, also usable are ones having, as the main chain thereof, any other polymer structure than (meth)acrylate or (meth)acrylamide structures, such as a polystyrene structure or a polyester structure. Also in this case, a polymerization initiator group may be previously introduced into these monomers to make the recurring unit in the resultant polystyrene or polyester structure polymer have the polymerization initiator group. From the polymerization initiator group, side chains may be grown to give a bottle brush structure having a polystyrene structure or a polyester structure as the main chain thereof.

Further, the side chains may also have any other polymer structure than (meth)acrylate-type or (meth)acrylamide-type structures. Monomers capable of forming such a polymer structure include vinyl monomers (radical-polymerizing monomers) such as styrene and derivatives thereof, vinyl esters, vinyl ketones, N-vinyl compounds, (meth)acrylonitrile, maleic acid and derivatives thereof, vinyl halides, and olefins.

[Other Components]

The SRT material of the present invention may be composed of an organic compound having a bottle brush structure alone, or may contain any other component. In the case where the SRT material contains any other component, the content of the organic compound having a bottle brush structure in the SRT material is preferably 10% by weight or more relative to the total amount of the SRT material, more preferably 15% by weight or more, and even more preferably 20% by weight or more.

The other component usable in the SRT material includes a second component and a lubricating liquid to be mentioned below, and also the composite of the present invention to be mentioned hereinunder. Regarding the description of the composite of the present invention, the description in the section of <Composite> given below may be referred to.

(Second Component)

The second component includes a fibrous substance, a non-porous inorganic material, a substance having a three-dimensional polymer network structure and the like. The SRT material of the present invention may contain any one alone of a fibrous substance, a non-porous inorganic material, and a substance having a three-dimensional polymer network structure, or may contain two or more thereof. The second component functions as a reinforcing filler that reinforces the SRT material. Containing the second component, the SRT material is given mechanical characteristics so that the SRT material can be prevented from being worn to lower the effect thereof, and the SRT material can therefore exhibit the low-friction performance and lubricity thereof for a long period of time when the machine parts slide.

The fibrous substance is a substance formed of fiber aggregates. The fibers to constitute fiber aggregates may be any of cellulose, fibrous proteins, mineral fibers, inorganic fibers, synthetic fibers, carbon fibers or carbon nanotubes, but from the viewpoint of softness thereof, preferred are cellulose, fibrous proteins, and synthetic fibers, and cellulose is more preferred. Cellulose is preferably cellulose nanofibers (cellulose fibers having a fiber diameter of 1 to 500 nm). The cellulose nanofibers include those derived from bacterial cellulose and those derived from plants such as wood. Plant-derived cellulose nanofibers have high productivity and are available at low cost, and are therefore highly practicable. Regardless of origin, preferable fibrous substances have a network structure of entangled fibers, and are swollen to gel when infiltrated with a liquid, and even after gelled, the aggregates can still maintain the network structure thereof. Owing to such properties, fibrous substances can effectively reinforce the SRT material of the invention, and in particular, when the SRT material contains a lubricating liquid to be mentioned below, it can be effectively reinforced by the fibrous substances.

The substance having a three-dimensional polymer network structure is a substance of a polymer in which plural polymer chains are crosslinked via crosslinking structure to construct a three-dimensional network structure. Such a substance may also be swollen to gel through liquid infiltration thereinto, and can therefore effectively reinforce the SRT material, and in particular, when the SRT material contains a lubricating liquid, the substance can exhibit a high reinforcing effect.

Examples of the nonporous inorganic material include silica, alumina, calcium carbonate, carbon black, nanocarbon materials (e.g., graphene), clay, and phyllosilicates.

In the case where the SRT material contains a second component, the content of the second component is preferably 0.01 to 10% by weight relative to the total amount of the SRT material. More preferably the content of the second component is 0.01% by weight or more relative to the total amount of the SRT material, even more preferably 0.1% by weight or more. Also preferably, the content of the second component is 50% by weight or less relative to the total amount of the SRT material, more preferably 10% by weight or less.

(Lubricating Liquid)

A lubricating liquid is a liquid that acts to improve the lubricity of the SRT material to thereby enhance the low-friction performance thereof. In the case where the SRT material contains a lubricating liquid, preferably, the organic compound having a bottle brush structure therein is swollen with the lubricating liquid. With that, the softness, the resilience and the low-friction performance of the SRT material can be further enhanced, and the durability thereof to friction can be thereby improved more.

Specifically, in the organic compound having a bottle brush structure, the polymer chains existing densely are swollen with the lubricating liquid and are thereby extended and stretched preferably to such a high degree as corresponding to fully-stretched chains. It is considered that, in the SRT material, when the polymer chains are swollen with the lubricating liquid therein, the SRT material can support a large load because of the high osmotic pressure effect owing to the concentrated solution system of the swollen polymer chain layer. In addition, it is considered that, in the contact region, the grafted polymer chains do not mutually intrude into each other owing to cancellation of the increase in the local concentration and owing to the large entropy gain therein (to be attained because of the highly-stretched state), but shrink to prevent them from being entangled, and accordingly, the low-friction characteristics could be thereby expressed. In that manner, the SRT material can express low-friction characteristics when the polymer chains therein are extended in a solvent, and therefore it is preferable that the SRT material is used in a lubricating liquid capable of swelling or extending polymer chains.

As the lubricating liquid that swells and extends polymer chains, a good solvent is preferred. A good solvent differs depending on the polymer chains constituting the organic compound, especially on the polymer chains constituting the side chains of the compound, and may be therefore appropriately selected depending on the polymer chains.

For example, in the case where the organic compound having a bottle brush structure has polymer chains of polymethyl methacrylate as the side chains, the good solvent is preferably an apolar solvent such as toluene or a hydrophobic ionic liquid.

In the case where the organic compound having a bottle brush structure has polymer chains of poly(2-ethylhexyl) methacrylate as the side chains, the good solvent is preferably an apolar solvent such as poly-α-olefin (PAO).

In the case where the organic compound having a bottle brush structure has hydrophilic polymer chains of polyethylene glycol (PEG) or the like as side chains, the good solvent is preferably an aqueous solvent including water or a polar organic solvent.

From the viewpoint of non-volatility, flame retardancy, heat resistance, electrochemical stability and the like, an ionic liquid is preferred in the case where the polymer chains that the organic compound has have high affinity thereto (especially in the case where the polymer chains have an ionic dissociable group).

The ionic liquid may also be called an ambient temperature molten salt, and this is a low-melting-point salt having ionic conductivity. Most of such salts are obtained by combining a cation of an organic onium ion and an organic or inorganic anion, and are characterized by having a relatively low melting point. The melting point of the ionic liquid is generally 100° C. or lower, preferably room temperature (25° C.) or lower.

The ionic liquid for use herein may be represented by the following general formula (10), and has a melting point of 50° C. or lower, preferably 25° C. or lower.

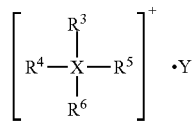

(10)

wherein $R^3$, $R^4$, $R^5$, and $R^6$ may be the same as or different from each other, each representing an alkyl group having 1 to 5 carbon atoms, or an alkoxyalkyl group represented by $R'-O-(CH_2)_n-$ (where R' represents a methyl group or an ethyl group, and n represents an integer of 1 to 4), and any two of these $R^3$, $R^4$, $R^5$, and $R^6$ may form a ring, but at least one of $R^3$, $R^4$, $R^5$, and $R^6$ is the above-mentioned alkoxyalkyl group; X represents a nitrogen atom or a phosphorus atom, and Y represents a monovalent anion.

The alkyl group having 1 to 5 carbon atoms includes a methyl group, an ethyl group, an n-propyl group, a 2-propyl group, an n-butyl group, and an n-pentyl group.

The alkoxyalkyl group represented by $R'-O-(CH_2)_n-$ is preferably a methoxymethyl group, or an ethoxymethyl group, a 2-methoxyethyl group, or a 2-ethoxyethyl group, a 3-methoxypropyl group, or a 3-methoxypropyl group, a 4-methoxybutyl group or a 4-ethoxybutyl group.

The compounds where any two of $R^3$, $R^4$, $R^5$, and $R^6$ form a ring and where X represents a nitrogen atom for use herein are preferably quaternary ammonium salts having an aziridine ring, an azetidine ring, a pyrrolidine ring, a piperidine ring or the like.

The compounds where any two of $R^3$, $R^4$, $R^5$, and $R^6$ form a ring and where X represents a phosphorus atom for use are preferably quaternary phosphonium salts having a pentamethylene phosphine (phosphorinane) ring or the like.

Quaternary ammonium salts having, as a substituent, at least one 2-methoxyethyl group where R' is a methyl group and n is 2 are preferred.

Also preferred are quaternary salts having, as substituents, a methyl group, two ethyl groups and an alkoxyethyl group and represented by the following general formula (II).

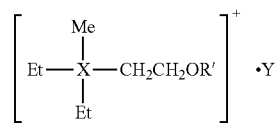

(11)

wherein R' represents a methyl group or an ethyl group, X represents a nitrogen atom or a phosphorus atom, and Y represents a monovalent anion; Me represents a methyl group; and Et represents an ethyl group.

The monovalent anion Y in the general formulae (10) and (11) is not specifically limited.

As the monovalent anion Y, preferred is use of $BF_4-$, $PF_6-$, $AsF_6-$, $SbF_6-$, $NbF_6-$, $HSO_4-$, $ClO_4-$, $CH_3SO_3-$, $CF_3SO_3-$, $CF_3CO_2-$, $(CF_3SO_2)_2N-$, $Cl-$, $Br-$, or $I-$. As the monovalent anion Y, especially preferred is $BF_4-$, $PF_6-$, $(CF_3SO_2)_2N-$, $CF_3SO_3-$, or $CF_3CO_2-$, from the viewpoint of the dissociation degree, the stability and the mobility and the like thereof in a non-aqueous organic solvent.

Among the quaternary salts represented by the general formulae (10) and (11), specific examples of quaternary ammonium salts and quaternary phosphonium salts preferred for use herein include the following compounds (12) to (20) (wherein Me represents a methyl group, and Et represents an ethyl group). As the quaternary ammoniums salts and the quaternary phosphonium salts, in particular, use of the quaternary ammonium salt represented by the following formula (12) or (17) is more preferred in consideration of providing SRT materials excellent in low-temperature characteristics. As the quaternary ammoniums salts and the quaternary phosphonium salts, use of the quaternary ammonium salt represented by the following formula (17) is especially preferred from the viewpoint that the salt has a low viscosity and therefore can reduce the kinematic frictional coefficient during sliding.

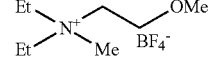

(12)

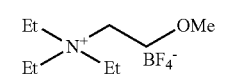
(13)

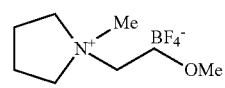
(14)

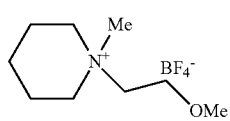
(15)

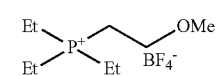
(16)

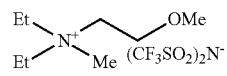
(17)

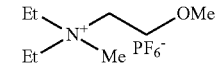
(18)

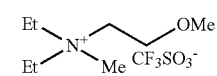
(19)

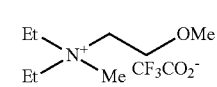
(20)

Any other ionic liquid than the compounds represented by the general formulae (10) and (11) is also employable here. For example, preferred is an ionic liquid containing an imidazolium ion represented by the following general formula (21).

The counter anion to form an ionic liquid that contains an imidazolium ion or an ionic liquid that contains any other aromatic cation includes monovalent anions that are the same as those in the general formulae (10) and (11).

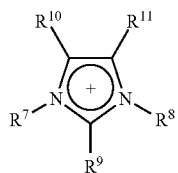
(21)

wherein $R^7$ represents an alkyl group having 1 to 4 carbon atoms, or a hydrogen atom, and is especially preferably a methyl group having one carbon atom; $R^8$ represents an alkyl group having 10 or less carbon atoms (optionally containing an ether bond), and a preferred example thereof is an ethyl group: $R^9$, $R^{10}$, and $R^{11}$ each independently represent an alkyl group having 1 to 20 carbon atoms and optionally containing an oxygen atom; $R^9$, $R^{10}$, and $R^{11}$ each may be a hydrogen atom.

Also preferred is an ionic liquid containing any other aromatic cation represented by the following formulae (22) to (27).

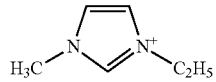
(22)

(23)

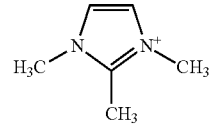
(24)

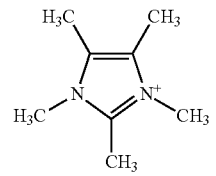
(25)

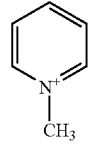
(26)

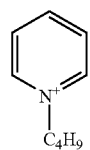
(27)

The method of swelling the organic compound having a bottle brush structure with a lubricating liquid is not specifically limited. For example, preferred is a method of applying a lubricating liquid to a film of an organic compound having a bottle brush structure formed on a substrate, or to a second component that carries an organic compound having a bottle brush structure, and then leaving it to stand as such, or a method of immersing a substrate having, as formed thereon, a film of an organic compound having a bottle brush structure or a second component that carries an organic compound having a bottle brush structure, in a lubricating liquid. In particular, according to the method using a second component, an SRT material having more excellent mechanical characteristics can be realized.

In the case where SRT material contains a lubricating liquid, the content of the lubricating liquid is preferably 20 to 90% by mass relative to the total amount of the SRT material, more preferably 50 to 80%. Further, the content of the lubricating material is more preferably 10% by weight or more relative to the total amount of the SRT material, more preferably 20% by weight or more. Also preferably, the content of the lubricating agent is 90% by weight or less relative to the total amount of the SRT material, more preferably 80% by weight or less.

[Bonding State of Bottle Brush Structure-Having Organic Compound]

Preferably, the SRT material of the present invention satisfies at least one of the following (1) and (2). Specifically, the SRT material of the present invention may satisfy any one of the following (1) and (2), or may satisfy both the two. With that, the strength of the SRT material may be further improved.

(1) Organic compounds having a bottle brush structure bond to each other via a covalent bond, an ionic bond, a hydrogen bond, a hydrophilic-lipophilic interaction or a phase separation structure.

(2) An organic compound having a bottle brush structure and a second component bond to each other via a covalent bond, an ionic bond, a hydrogen bond, a hydrophilic-lipophilic interaction or a phase separation structure.

The covalent bond between organic compounds or between an organic compound and a second component may be formed, for example, by introducing a substituent (crosslinking group) reactive with one organic compound or the second component, into any site in another organic compound followed by reacting the crosslinking group and the organic compound or the second component. The site of the organic compound to have the crosslinking group may be in the main chain or in side chains, and the number of the crosslinking groups that the organic compound is to have may be one or two or more. All or a part of the organic compounds that the SRT material contains may have a crosslinking group. In the case of bonding between organic compounds, the bonding may be at the main chains of the compounds or may be at the side chains thereof. The side chains that the organic compounds have may bond to each other.

The crosslinking group includes an azide group, a halogen group (preferably a bromine group) and the like. In the case where side chains are extended from the main chain in the process of synthesizing an organic compound, the reactive group having remained in the main chain as an unreacted group, or the reactive group at the terminal of the side chains may act as the crosslinking group. A hydroxyl group or the like that the second compound has may act as the crosslinking group.

Alternatively, a small amount of a bifunctional monomer may be previously added to the polymerization reaction liquid in synthesizing an organic compound, and simultaneously with polymerization reaction, a crosslinked structure may be formed between the organic compounds or between the organic compound and the second component. The bifunctional monomer includes ethylene glycol dimethacrylate, divinyl monomer and the like.

An ionic bond between organic compounds or an ionic bond between an organic compound and a second component may be formed by introducing an ionic group into an organic compound in place of the above-mentioned crosslinking group and introducing an antipolar ionic group into the organic compound and the second component to be bonded. Here, the ionic group may be an anionic group or a cationic group, or a substituent capable of being converted into such a group. The ionic group includes a carboxyl group (—COOH), a sulfo group (—SO$_3$H), a phosphono group (—P(O)(OH)$_2$), a phosphonoxy group (—OP(O)(OH)$_2$), an anionic group formed by removing a hydrogen ion from these groups, a quaternary ammonium group and the like.

A hydrogen bond is a non-covalent bond-type gravitational interaction between the hydrogen atom bonding to an atom having a large electronegativity in a mode of covalent bonding, and an atom having a large electronegativity (e.g., nitrogen, oxygen, sulfur, fluorine) positioned around it or a π-atom, and may be formed, for example, by introducing a hydroxyl group (—OH) or an imino group (=NH) into an organic compound or a second component to thereby make the other end to be bonded have the atom having a large electronegativity and thereby to form a hydrogen bonding connection between organic compounds or between an organic compound and a second component.

A hydrophobic interaction is a gravimetric interaction owing to the hydrophobic effect of hydrophobic groups. The hydrophobic groups include alkyl group and an aryl group not substituted with a hydrophilic group such as a hydroxyl group. By making an organic compound or a second compound have such a structure, a bond of hydrophobic interaction may be formed between organic compounds or between an organic compound and a second component.

A phase separation structure is a polymer aggregation structure to be formed through self-assembly of block copolymers formed of blocks that are immiscible with each other, and by making an organic compound have such a block structure, a bond of a polymer aggregation structure may be formed therein.

[Effective Surface Occupancy of Side Chains of Bottle Brush Structure]

Preferably, the effective surface occupancy of the side chains of the bottle brush structure in the SRT material is 1% or more, more preferably 5 to 50%, and even more preferably 10 to 50%. With that, the SRT material exhibits excellent low-friction performance.

Here, the effective surface occupancy (σ*) of the side chains of the bottle brush structure is represented by the following equation (1). A polymer chain has a certain volume and each side chain formed of such a polymer chain may be considered to be columnar. The density σ of the side chains of the bottle brush structure indicates the number of the side chains per unit area of a virtual outer periphery (an outer periphery of a column whose central axis is the main chain and whose diameter is [(length of side chain)×2+ (diameter of main chain)]) of the bottle brush structure, and therefore the effective surface occupancy is a value that expresses the proportion of the tips of the side chains relative to the virtual outer periphery of the bottle brush structure in a state where the side chains are extended linearly in the vertical direction from the main chain.

The effective surface occupancy is a value of 0 to 100, and a larger value thereof means that the proportion of the tips of the side chains relative to the virtual outer periphery of the bottle brush structure is larger. Consequently, the effective surface occupancy is considered to be a numeral value that reflects the structural latitude of side chains. It is considered that, when the effective surface occupancy is large, the structural latitude of side chains is limited, and side chains may maintain the state where they extend nearly in the vertical direction relative to the main chain. It is presumed that, when side chains extend nearly in the vertical direction relative to the main chain, the surface of the SRT material can readily take a structure where the side chains stand vertically to the main chain and can exhibit the properties intrinsic to that structure.

The equation (1) to provide the effective surface occupancy (a) is shown below.

$$\sigma^* = \frac{1}{\left(L \times \frac{M_{n,side\ chain}}{M_{n,monomer}} + r_{main\ chain}\right)} \times \frac{(W_{side\ chain}/W_{main\ chain})}{(M_{n,side\ chain}/M_{n,main\ chain})} \times \frac{A_{side\ chain}}{2\pi L} \quad (1)$$

wherein $r_{main\ chain}$ represents the radius of the main chain; $A_{side\ chain}$ represents the cross-sectional area of the side chain; $M_{n,\ monomer}$, $M_{n,\ side\ chain}$ and $M_{n,\ main\ chain}$ each represent the molecular weight of the side chain monomer, the number-average molecular weight of the side chains, and the molecular weight of the main chain recurring unit, respectively; $W_{side\ chain}$ and $W_{main\ chain}$ each represent the weight of the side chain and the weight of the main chain, respectively; and L represents the unit length of the polymer chain.

The density σ of the side chains of the bottle brush structure is expressed as a unit of [chains/nm²], and is determined according to the following equation (2).

$$\sigma = \frac{\sigma^*}{A_{side\ chain}} \quad (2)$$

The cross-sectional area $A_{side\ chain}$ of the side chain is represented by the following equation (3).

$$A_{side\ chain} = \frac{M_{n,monomer}/\text{Avogadro number}}{\rho_{side\ chain} \times L} \quad (3)$$

wherein $\rho_{side\ chain}$ represents the density of the side chains.

[Characteristics of SRT Material]
(Indentation and Compressive Elasticity Modulus)

Preferably, the SRT material of the present invention has an indentation of 100 nm or more and a compressive elasticity modulus of 1 MPa or more. The SRT material whose indentation and compressive elasticity modulus each fall within the above range hardly undergoes plastic deformation or fracture by pressure, and therefore can be favorably used not only for slide members of machine parts but also for bearings and seals that are given pressure.

The indentation and the compressive elasticity modulus of the SRT material can be measured according to the methods described in the section of Examples.

(Frictional Coefficient (μ) of SRT Material)

The frictional coefficient (μ) of the SRT material of the present invention is preferably 0.1 or less, more preferably 0.01 or less, even more preferably 0.001 or less.

The frictional coefficient (μ) may be measured according to a pin-on-disc test. Specifically, for example, using a tribometer UMT TriboLab available from Bruker, an SRT material infiltrated with a good solvent is adhered to a pin, and slide against a sample disc under a load (Fn) of 0.1 to 40 N and at a rotation speed of 10 to 2000 rpm to measure the friction force (Fs). A ratio of the friction force (Fs) to the load (Fn), (Fs/Fn) is the frictional coefficient (μ).

[Shape of SRT Material]

Not specifically limited, the shape of the SRT material is preferably a sheet-like one. The thickness of the sheet-like SRT material may be appropriately selected depending on the use thereof, but is preferably 0.1 to 50,000 μm, more preferably 1 to 2,000 μm, even more preferably 5 to 1,000 μm.

<Composite>

Next described is the composite of the present invention.

The composite of the present invention is formed of an organic compound having a bottle brush structure and a reinforcing filler.

Regarding the description, the preferred range and specific examples of the organic compound having a bottle brush structure, referred to is the section of "Organic Compound Having Bottle Brush Structure" relating to the SRT material given hereinabove.

[Reinforcing Filler]

The reinforcing filler is a substance that acts to reinforce the composite, for which usable here is the second component of an optional component for the SRT material mentioned hereinabove, that is, a fibrous substance, a non-porous inorganic material or a substance having a three-dimensional polymer network structure. Regarding the description, the preferred range and specific examples of these substances, referred to is the section of (Second Component) given hereinabove. Among these, cellulose nanofibers are especially preferred for the reinforcing filler for the composite.

Preferably, the reinforcing filler in the composite of the present invention has concentrated polymer brushes. "Concentrated polymer brush" has plural polymer chains bonding to the surface of a reinforcing filler and forms aggregates of brush-like polymer chains as a whole. Regarding the description, the preferred range and specific examples of the polymer chain, referred to are the description, the preferred range and specific examples of the side chains and "Polymer A" in the general formula (1) of an organic compound having a bottle brush structure given hereinabove. When the reinforcing filler has concentrated polymer brushes, the density of the polymer chains in the composite may increase and therefore the softness, the low-friction performance and the lubricity of the composition can be thereby noticeably enhanced. In the case where the reinforcing filler has concentrated polymer brushes, each polymer chain of the concentrated polymer brushes may be considered to be the side chain of the reinforcing filler.

In the case where the reinforcing filler has the above-mentioned side chains (polymer chains of concentrated polymer brushes), the side chains of the bottle brush structure-having organic compound and those of the reinforcing filler may be the same as or different from each other, but preferably the organic compound and the reinforcing filler has side chains of the same recurring unit, and more preferably, all the recurring units of the side chains of the organic compound and the reinforcing filler are the same. With that, the composite may secure uniform low-friction performance and mechanical characteristics as a whole.

On the other hand, preferably, in the composite of the present invention, the weight of the bottle brush structure-having organic compound except the side chains thereof is not lower than 5 times the weight of the reinforcing filler except the side chains thereof, more preferably not lower than 10 times. With that, the softness, the resilience and the low-friction performance of the bottle brush structure can be effectively reflected as the characteristics of the entire composite.

[Bonding Condition of Bottle Brush Structure-Having Organic Compound]

Preferably, the composite of the present invention satisfies at least one of the following (1) and (2). Specifically, the composite of the present invention may satisfy any one alone of the following (1) and (2), or may satisfy both the two. With that, the strength of the SRT material may be further improved.

(1) Organic compounds having a bottle brush structure bond to each other via a covalent bond, an ionic bond, a hydrogen bond, a hydrophilic-lipophilic interaction or a phase separation structure.

(2) An organic compound having a bottle brush structure and the reinforcing filler bond to each other via a covalent bond, an ionic bond, a hydrogen bond, a hydrophilic-lipophilic interaction or a phase separation structure.

Regarding the description of the conditions (1) and (2), referred to is the corresponding description in the section of "Bonding Condition of Bottle Brush Structure-Having Organic Compound" for the SRT material given hereinabove, in which the "second component" is replaced with "the reinforcing filler".

Here, in particular, the bottle brush structure-having organic compound and the reinforcing filler are covalent-bonded to each other via a crosslinked structure, and also preferably, the organic compounds themselves or the side chains of the organic compounds may be covalent-bonded via a crosslinked structure. More preferably, these are covalent-bonded in both states.

The crosslinking density of the composite is preferably in such a degree that the bottle brush structure-having organic compound does not dissolve out even when the composite is repeatedly washed with a solvent.

[Density of Side Chains]

The density of the side chain of the bottle brush structure, and the density of the side chains, if any, of the reinforcing filler each are, from the viewpoint of more improving the softness, the low-friction performance and the lubricity of the SRT material, preferably within the following range.

The density of the side chains of the bottle brush structure is preferably 0.1 chains/nm$^2$ or more, more preferably 0.2 to 0.6 chains/nm$^2$.

The density of the side chains, if any, of the reinforcing filler is preferably the same as or larger than that of the density of the side chains of the bottle brush structure. The density of the side chains, if any, of the reinforcing filler is preferably 0.1 chains/nm$^2$ or more, more preferably 0.2 to 0.6 chains/nm$^2$.

The density of the side chains of the bottle brush structure and the density of the side chains of the reinforcing filler may be determined according to the equations (2) and (3) described in the section of "Effective Surface Occupancy of Bottle Brush Structure" relating to the SRT material mentioned hereinabove.

[Effective Surface Occupancy of Side Chains]

The effective surface occupancy of the side chains of the bottle brush structure and the effective surface occupancy of the side chains, if any, of the reinforcing filler each are, from the viewpoint of more improving the low-friction performance and the lubricity of the composite, preferably within the following range.

The effective surface occupancy of the side chains of the bottle brush structure is preferably 1% or more, more preferably 5% or more, and even more preferably 10 to 50%.

The effective surface occupancy of the side chains, if any, of the reinforcing filler is preferably the same as or larger than the effective surface occupancy of the side chains of the bottle brush structure. The effective surface occupancy of the side chains of the reinforcing filler is preferably 1% or more, more preferably 5 to 50%, and even more preferably 10 to 50%.

The effective surface occupancy of the side chains of the bottle brush structure and the effective surface occupancy of the side chains, if any, of the reinforcing filler may be determined according to the equations (1) to (3) described in the section of "Effective Surface Occupancy of Bottle Brush Structure" relating to the SRT material mentioned hereinabove.

[Properties of Composite]

Preferably, the composite of the present invention is in the form of gel. The composite in the form of gel can have more improved softness, resilience and low-friction performance and can secure high durability against sliding of machine parts.

The solvent for gelling the composite is not specifically limited, and may be any solvent that does not react with the components constituting the composite and that has an affinity to the components constituting the composite. For example, from among ordinary solvents such as aqueous solvents, alcohols, ketones, esters, aromatic hydrocarbons, halogenohydrocarbons, as well as dimethylformamide, dimethylacetamide, dimethyl sulfoxide and sulfolane, any one or more may be appropriately selected and used. One kind alone or two or more kinds of these solvents may be sued either singly or as combined.

Preferably, the solvent for gelling the composite is a liquid having lubricity (lubricating liquid). For the description, the preferred range and specific examples of the lubricating liquid, those given in the section of (Lubricant) relating to the SRT material may be referred to.

<Production Method for Composite>

Next, a method for producing the composite is described.

The method for producing the composite of the present invention is a method for producing a composite of an organic compound having a bottle brush structure and a reinforcing filler, including graft-polymerization of a mixture of a polymer that contains recurring units having a polymerization initiator group, and a reinforcing filler.

Regarding the description, the preferred range and specific examples of the composite to be produced, the section of <Composite> given hereinabove may be referred to.

In the polymer, the polymer chains containing a recurring unit having a polymerization initiator group are to form the main chain of the bottle brush structure, and the polymerization initiator group that each recurring unit has is an active point at which graft polymerization starts. From the polymerization initiator group, graft polymerization starts to extend polymer chains, thereby forming side chains of the bottle brush structure. Accordingly, a composite of an organic compound having a bottle brush structure and a reinforcing filler can be produced.

In the following, the graft polymerization and the mixture to be used in the production method for the composite of the present invention are described.

[Graft Polymerization]

Graft polymerization can readily form side chains having a uniform chain length, for which, therefore, a living radical polymerization method is preferred. The living radical polymerization method includes an atomic transfer radical polymerization method (ATRP), a reversible addition-fragmentation chain transfer polymerization method (RAFT), a nitroxide mediated polymerization method (NMP), and a living radical polymerization method using an organic catalyst (a reversible chain transfer catalyzed polymerization method (RTCP) or a reversible complexation mediated polymerization method (RCMP)). Any of these polymerization methods is employable, but atomic transfer radical polymerization is preferred here. In the case where graft polymerization is carried out according to atomic transfer radical polymerization, a halogenoalkyl group as an atomic transfer radical polymerization initiator group is introduced into the recurring units of the polymer. Graft polymerization may be in any mode of a grafting-from method, a grafting-to method or a grafting-through method, but a grafting-from method is preferred. Here, in the grafting-from method, a main chain is first formed, and subsequently side chains are grown from the main chain. In the grafting-to method, reactive side chains that have been previously synthesized are bonded to the main chain. In the grafting-through method, a macromonomer having a polymerizing group at the terminal of the polymer to constitute side chains is polymerized.

In the case where graft chains are grown according to graft polymerization, preferably, graft chains that are more than the total weight of the polymer and the reinforcing filler contained in the mixture are grown. In that manner, a composite excellent in softness, low-friction performance and lubricity can be produced.

[Mixture]

The mixture of a polymer and a reinforcing filler to be used in the production method of the present invention is preferably a mixture of a polymer having recurring units having an atomic transfer radical polymerization initiator group and a reinforcing filler, more preferably one prepared by polymerizing a monomer having an atomic transfer radical polymerization initiator group in the presence of a reinforcing filler, and even more preferably one prepared by polymerizing a monomer having an atomic transfer radical polymerization initiator group and a monomer having 2 or more polymerizing groups in the presence of a reinforcing filler.

Here, the monomer having an atomic transfer radical polymerization initiator group is one that may be polymerized to give a polymer containing recurring units having an atomic transfer radical polymerization initiator group. With that, a composite where the reinforcing filler and the polymer are integrally compounded can be obtained and, in particular, in the case where a monomer having 2 or more polymerizing groups is used, a crosslinking structure is formed between the side chains of the bottle brush structure and a composite having a high strength can be obtained.

In the case where a monomer having 2 or more polymerizing groups is used, the amount thereof to be used is preferably 0.01 to 1 mol % of the monomer having an atomic transfer radical polymerization initiator group. With that, a crosslinking structure may be formed appropriately and a low-friction material (composite) that has a high strength and is soft can be obtained.

Also preferably, the mixture is one prepared by infiltrating a polymer containing recurring units having an atomic transfer radical polymerization initiator group into a reinforcing filler.

In this case, too, a composite where the reinforcing filler and the polymer are integrally compounded can be obtained.

Preferably, these mixtures contain the above-mentioned polymer in an amount of 5 times by weight or more of the reinforcing filler. With that, a composite where the weight except the side chains of the bottle brush structure-having organic compound is not less than 5 times the weight except the side chains of the reinforcing filler can be produced. In the composite thus produced, the softness, the resilience and the low-friction performance of the bottle brush structure can be effectively reflected as the characteristics of the entire composite, and therefore the composite can be effectively used as the SRT material for various machine devices.

Preferably, the mixture is in the form of a gel. The gel mixture contains a liquid, though solid, and is therefore easy to handle, and synthesis reaction with it can be smoothly promoted.

Next described are the polymer and the reinforcing filler contained in the mixture.

(Polymer)

The polymer containing recurring units having a polymerization initiator group is preferably a compound represented by the following general formula (2).

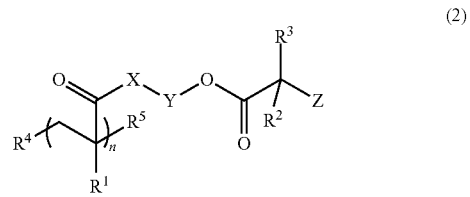

wherein $R^1$, $R^2$, $R^3$, $R^4$, $R^5$, X, Y and n each have the same meanings as those of $R^1$, $R^2$, $R^3$, $R^4$, $R^5$, X, Y and n, respectively, in the general formula (1); Z represents a halogen atom and is preferably a bromine atom.

In this polymer, the carbon atom-halogen (Z) bond is radically cleaved to initiate atomic transfer radical polymerization reaction. Namely, the halogenoalkyl group functions as an atomic transfer radical polymerization initiator group. However, the polymer for use in the production method of the present invention may contain, as mixed therein as a part thereof, a polymer not having Z introduced into the terminal of the side chain.

As the polymer that contains recurring units having a polymerization initiator group, any other initiator group-containing polymer described in the section of "Bottle Brush Structure-Having Organic Compound] can also be used.

(Reinforcing Filler)

Regarding the description, the preferred range and specific examples of the reinforcing filler, the section of [Reinforcing Filler] (but excepting the description relating to the concentrated polymer brush and the side chains) for the composite given hereinabove may be referred to.

Preferably, the reinforcing filler for use in the mixture has a fiber network structure and the fiber network structure can be kept as such after graft polymerization. As such a reinforcing filler, preferred is a cellulose nanofiber gel.

Here, the reinforcing filler for use in the production method for the composite may have plural atomic transfer radical polymerization initiator groups. With that, during the above-mentioned graft polymerization, both the atomic transfer radical polymerization initiator group of the polymer and the atomic transfer radical polymerization initiator group of the reinforcing filler react so that polymer chains extend from each polymerization initiator group. As a result, plural side chains may be formed also in the reinforcing filler, and in the case where the side chains exist at a high density, aggregates of these side chains can function as concentrated polymer brushes.

In the case where the reinforcing filler has an atomic transfer radical polymerization initiator group, preferably, the atomic transfer radical polymerization initiator group thereof and the atomic transfer radical polymerization initiator group that the recurring units of the polymer contain a structure common to the two. With that, from each atomic transfer radical polymerization initiator group, graft chains having common recurring units may be grown. As a result, a composite whose characteristics are uniform as a whole can be produced.

<Use of SRT Material and Composite>

The SRT material and the composite of the present invention have softness and resilience and have excellent low-friction performance, and therefore can be effectively used as members of machine devices that require such properties. In particular, the SRT material and the composite of the present invention are favorably used as slide members of sliding mechanisms, and are also favorably used as members for bearing and seals. In the case where the SRT material and the composite of the present invention are applied to sliding mechanisms, the SRT material and the composite may be given to one of a pair of slide surfaces sliding to each other, or may be given to both the two, but is preferably given to both a pair of slide surfaces.

Regarding the method for giving the SRT material and the composite to each part, employable is a method of fixing a sheet-like SRT material or composite to the surface to which the material or composite is to be given, by bonding, welding or the like.

EXAMPLES

The invention is described in more concretely with reference to the following Examples and Comparative Examples given below. In the following Examples, the material used, its amount and ratio, the details of the treatment and the treatment process may be suitably modified or changed not overstepping the spirit and the scope of the invention. Accordingly, the invention should not be limitatively interpreted by the Examples mentioned below. The number-average molecular weight Mn and the weight-average molecular weight Mw were measured through gel permeation chromatography (elution solvent: dimethylformamide containing 10 mM LiBr) and using a detector (differential refractive index detector, multi-angle light scattering detector), and polymethyl methacrylate was used as a calibration sample for free poly(poly(ethylene glycol)methyl ether methacrylate).

In the pin-on-disc test for a friction test (for measurement for stribeck curve), used was a tribometer UMT TriboLab by Bruker, in which a measurement sample (radius: 6 mm, thickness: 1 mm) was bonded to the pin, a comparative sample 2 was arranged on the opposite surface, and the frictional force ($F_s$) of the sample was measured under a predetermined load ($F_n$) at a rotation speed (0.1 to 2000 rpm) in a solvent. The frictional coefficient ($\mu$) is defined as a ratio of $F_s$ to $F_n$ ($F_s/F_n$).

For measurement of compressive characteristic, the sample was analyzed at a compression rate of 10%/min, a sample thickness of 2 mm, and a sample size of 5×5 mm.

For measurement of compressive stress-strain curve, a rheometer (ARES-G2 by TA Instruments) was used. A stainless pin (radius: 4 mm) was pressed to the measurement sample (radius: 6 mm, thickness: 1 mm) bonded to a glass substrate in such a manner that the sample could be given a compressive strain of 0.1 to 0.2, and under the condition, the glass substrate was rotated during measurement. Here, the shear strain rate was 0.01 s$^{-1}$, 1 s$^{-1}$ or 10 s$^{-1}$.

For measurement of storage elasticity modulus G', a rheometer (ARES-G2 by TA Instruments) was used. A stainless pin (radius: 4 mm) was pressed to the measurement sample (radius: 6 mm, thickness: 1 mm) bonded to a glass substrate in such a manner that the sample could be given a compressive strain of 0.1 to 0.2, and under the condition, the glass substrate was reciprocated during measurement. Here, the shear strain rate was 0.05 s$^{-1}$.

For measurement of the load-strain curve in Example 1, a tension and compression tester (TENSILON by T & D) was used. In the test, a load was applied to a measurement sample (about 10 mm×10 mm, thickness: 1 mm) at a strain rate of 10%/min. For measurement of the load-strain curve in Examples 2 to 5, a tribometer (UMT TriboLab by Bruker) was used. A measurement sample (radius: 6 mm, thickness: 1 mm) bonded to a stainless pin (radius: 6 mm) was kept in contact with the surfaces of concentrated polymer brushes arranged on a silicon substrate, and a load of 40 N/min was applied to the sample during measurement.

For measurement of compressive elasticity modulus, a tension and compression tester (TENSILON by T & D) was used.

(Example 1) Production of Composite Gel 1 Composed of Bottle Brush Structure-Having Organic Compound and Concentrated Polymer Brushes-Having Cellulose (Reinforcing Filler)

Figure 2:
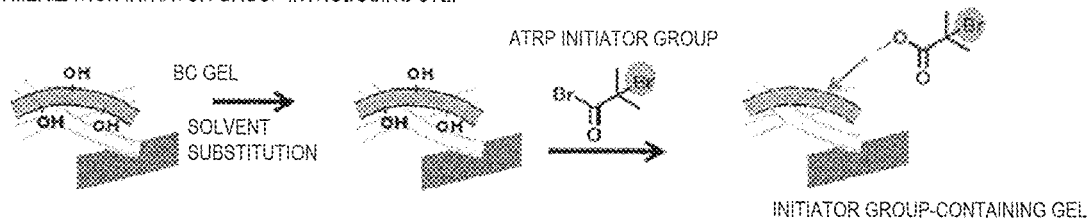
FIG. 2 is a schematic view showing a production process for a composite gel 1.
Figure 2:
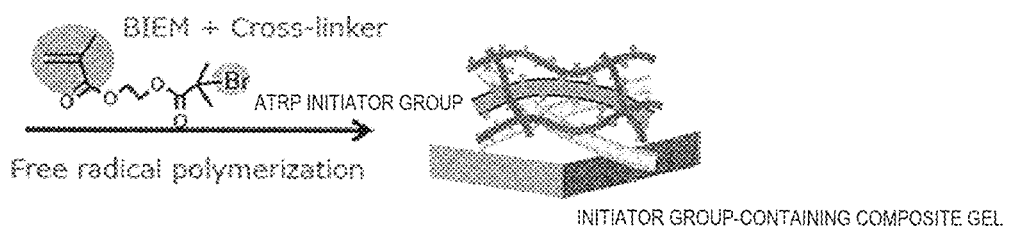
Figure 2:
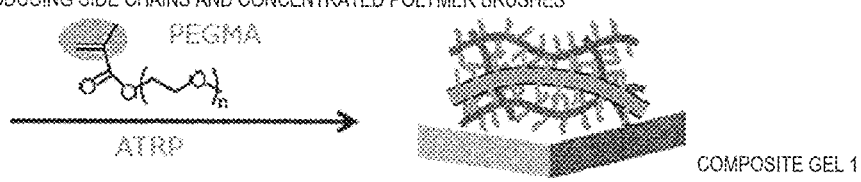

According to the following processes (1) to (3), a composite composed of a bottle brush structure-having organic compound and a concentrated polymer brushes-having cellulose (reinforcing filler) was produced. The production scheme is shown in FIG. 2.

(1) Step of Introducing Polymerization Initiator Group into Surface of Cellulose A cellulose (bacterial cellulose by Fujicco (BC)) having a thickness of about 1 cm and a width of about 5 cm square was alkali-processed to remove acetic acid bacteria. The resultant cellulose hydrogel (355 parts, 0.5% by weight) was immersed in about 3 times of tetrahydrofuran (THF), and shaken for 24 hours using a shaker (Multishaker MMS by EYELA). The solvent was removed, then the same amount of fresh THF was added, and shaken in the same manner. This treatment was repeated for a total of 4 times. Next, the solvent was changed to 500 mL of N-methylpyrrolidone (NMP), and the same treatment was repeated for a total of 6 times to thereby replace the inclusive THF in cellulose with NMP. Next, in an ice bath, 7.4 mL of 2-bromoisobutyryl bromide (BiBB: 2 equivalents per hydroxyl group) and 9.6 mL of dewatered pyridine (4 equivalents per hydroxyl group) were added, and then reacted for 24 hours at room temperature. Washed with methanol, an initiator group-fixed cellulose (Br—BC) was prepared. In elementary analysis, Br was 5.48%, and therefore the substitution degree was calculated to be 0.12. For the next reaction, the inclusive water in the gel was replaced with anisole according to the above-mentioned method to give an anisole gel (0.56% by weight) of Br—BC (polymerization initiator group-introduced cellulose). In the following, the Br—BC gel produced in the step (1) is referred to as "initiator group-containing gel".

(2) Step of Producing Composite Gel Composed of Main Chain Precursor and Initiator Group-Containing Gel 4.7 parts of an initiator group-containing gel was held between slide glass cells spaced with a 2-mm spacer put therebetween, immersed in a polymerization liquid containing 11.5 parts of 2-(2-bromoisobutyryloxy)ethyl methacrylate (BIEM), 0.12 parts of poly(ethylene glycol) dimethacrylate (mean molecular weight 550), 0.34 parts of azobisisobutyronitrile, and 26.3 parts of anisole, then left in an explosion-proof refrigerator at 0 to 5° C. for 24 hours, deoxygenated with argon gas, and polymerized at 60° C. for 24 hours. After polymerization, this was well washed with anisole to give a composite gel Br—BC/PBIEM (poly(2-(2-bromoisobutyryloxy)ethyl methacrylate). Here, "PBIEM" corresponds to "main chain precursor" to constitute a main chain after introduction of side chains thereinto in the next step (3). In the following, the composite gel Br—BC/PBIEM produced in the step (2) is referred to as "initiator group-containing composite gel".

(3) Step of Introducing Side Chains and Concentrated Polymer Brushes Through Graft Polymerization 0.018 parts of ethyl 2-bromo-2-methylpropionate, 9.0 parts of poly(ethylene glycol) methyl ether methacrylate (PEGMA; mean molecular weight 475), 0.047 parts of copper(I) chloride, 0.012 parts of copper(II) chloride, 0.46 parts of 4,4'-dinonyl-2,2'-bipyridyl and 30 parts of anisole were combined to prepare a polymerization solution. Next, 5.31 parts of the initiator group-containing composite gel was added, left in an explosion-proof refrigerator at 0 to 5° C. for 24 hours, deoxygenated with argon gas, and polymerized at 60° C. for 2 hours. Here, the number-average molecular weight Mn of poly(poly(ethylene glycol) methyl ether methacrylate) (PPEGMA) liberated in the reaction liquid was measured and was $4.1 \times 10^3$. "PPEGMA" corresponds to each polymer chain introduced into the main chain and into the surface of cellulose by graft polymerization (hereinafter this may be referred to as "graft chain"). Accordingly, the above-mentioned measurement results confirm that graft chains having a number-average molecular weight Mn of $4.1 \times 10^3$ were introduced into the main chain and the cellulose through the graft polymerization.

In the above-mentioned process, a composite gel composed of a bottle brush structure-having organic compound and a concentrated polymer brushes-having cellulose (reinforcing filler) was produced. In the following, the graft chains-introduced composite gel is referred to as "composite gel 1".

(Comparative Example 1) Production of Concentrated Polymer Brushes-Having Cellulose Gel According to the same process as in the step (3) in Example 1, except that 2.6 parts of Br—BC gel (initiator group-containing gel) was sued in place of the initiator group-containing composite gel, a comparative sample 1 of concentrated polymer brushes-having cellulose gel (graft chains-introduced gel) was produced.

(Comparative Example 2) Production of Concentrated Polymer Brushes-Given Substrate A glass disc having a diameter of 30 mm was put into a polymerization solution of 0.012 parts of ethyl 2-bromo-2-methylpropionate, 6.0 parts of poly(ethylene glycol) methyl ether methacrylate (hereinafter, PEGMA: mean molecular weight 475), 0.013 parts of copper(I) chloride, 0.11 parts of 4,4'-dinonyl-2,2'-bipyridyl and 18 parts of anisole, and subjected to polymerization at 60° C. for 24 hours. After polymerization, the sample was taken out, ultrasonically washed with tetrahydrofuran (hereinafter, THF) and dried to give a glass disc having polymer graft chains introduced into the substrate surface thereof (concentrated polymer brushes-given substrate: comparative sample 2).

[1] Evaluation of Graft Chains Introduction Condition

Each of the initiator group-containing gel, the initiator group-containing composite gel and the composite gel 1 produced in Example 1 and the comparative sample 1 was dried, the weight thereof was measured, and the from the dry weight difference between the samples, the weight ratio of the cellulose, the main chain of the bottle brush structure and the polymer chain (graft chain) introduced by graft polymerization was estimated. The results are shown in Table 1.

TABLE 1

|  | Composition Ratio (% by weight) | | |
| --- | --- | --- | --- |
|  | Cellulose | Main Chain of Bottle Brush | Graft Chain |
| Initiator Group-Containing Gel | 0.63 | — | — |
| Comparative Sample 1 (graft chains-introduced gel) | 0.63 | — | 0.2 |
| Initiator Group-Containing Composite Gel | 0.84 | 7.8 | — |
| Composite Gel 1 (graft chains-introduced composite gel) | 0.53 | 4.9 | 19.6 |

In gel permeation chromatography (MALS detection) of the comparative sample 2 for the free initiator-derived free polymer and in ellipsometry of the comparative sample 2, the dry film thickness (graft amount) of the concentrated polymer brush layer formed on the glass disc and the molecular weight of each polymer chain were analyzed. Using the results of the analysis, the density and the effective surface occupancy of the graft chains introduced into the cellulose, and the density and the effective surface occupancy of the graft chains introduced into the main chain of the bottle brush structure were calculated. The results are shown in Table 2.

TABLE 2

|  | Density of Graft Chains (chains/nm$^2$) | Effective Surface Occupancy of Graft Chains (%) |
| --- | --- | --- |
| Cellulose | 0.25 | 69 |
| Bottle Brush | 0.29 | 17 |

As shown in Tables 1 and 2, the graft chains introduced into the composite gel 1 had a density and an effective surface occupancy suitable as those of the side chains of the bottle brush structure and the polymer chains of the concentrated polymer brushes. In addition, the density of the side chains of the bottle brush structure was 0.1 chains/nm or more.

[2] Evaluation of Friction Characteristics and Mechanical Characteristics

Figure 3:
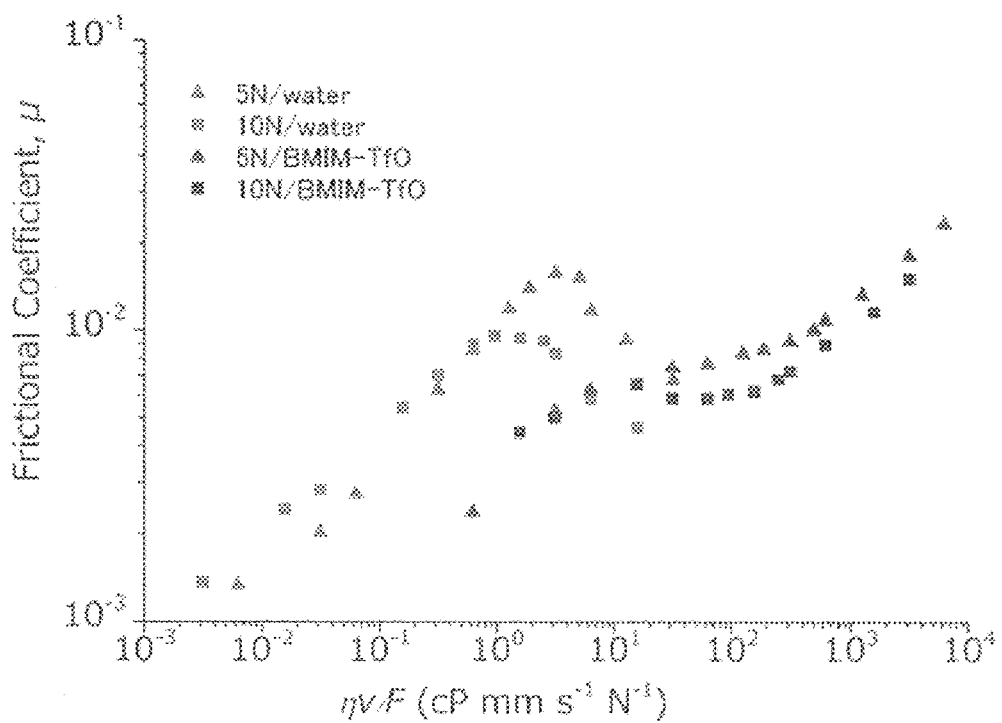
FIG. 3 is a stribeck curve of the composite gel 1 infiltrated with a lubricating liquid.

FIG. 3 shows a stribeck curve of the composite gel 1, indicating the friction characteristics thereof. In FIG. 3, "5 N/water" shows the friction characteristics measured under a load of 5 N using water as the lubricating liquid; "10

Figure 4:
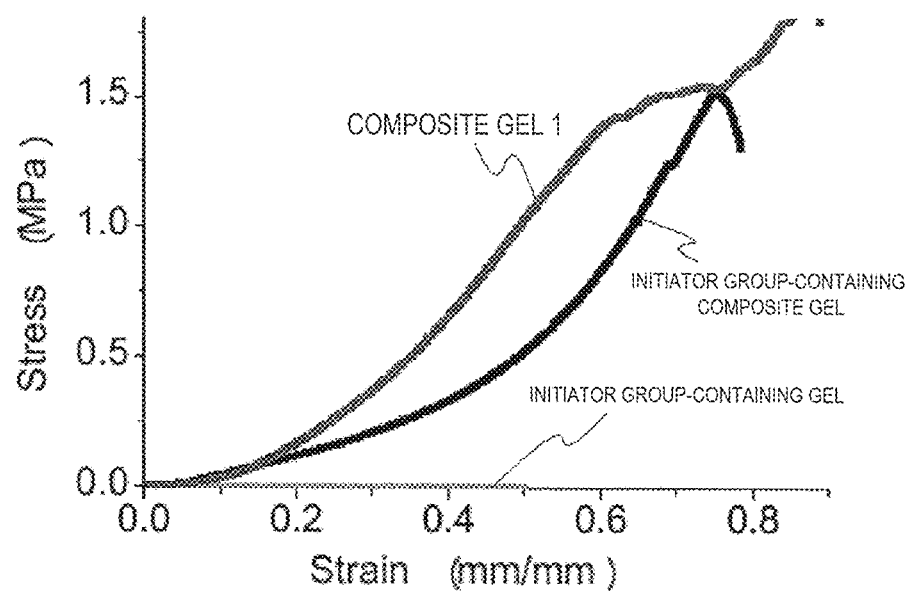
FIG. 4 is a graph showing compressive characteristics of the composite gel 1, an initiator group-containing gel and an initiator group-containing composite gel.

N/water" shows the friction characteristics measured under a load of 10 N using water as the lubricating liquid; "5 N/BMIM-Tf0" shows the friction characteristics measured under a load of 5 N using BMIM-Tf0 as the lubricating liquid; and "10 N/BMIM-Tf0" shows the friction characteristics measured under a load of 10 N using BMIM-Tf0 as the lubricating liquid. BMIM-Tf0 is 1-butyl-3-methylimidazolium trifluoromethanesulfonate. FIG. 4 shows the measurement results of compressive characteristic values of the composite gel 1, the initiator group-containing gel and the initiator group-containing composite gel, and Table 3 shows the measurement results of mechanical characteristics thereof. For comparison, Table 3 also shows the mechanical characteristic values of a composite gel composed of cellulose and gelatin (BC/Gelatin gel) (quoted from Nakayama, A., Kakugo, A., Gong, J. P., Osada, Y., Takai, M., Erata, T., Kawano, S. (2004); High mechanical strength double-network hydrogel with cellulose: Advanced Functional Materials, 14(11), 1124-1128). In this measurement, the composite gel 1 and the initiator group-containing gel are hydrogels, and the initiator group-containing composite gel is an anisole gel.

TABLE 3

|  | Swelling Degree | Initial Elastic Modulus (MPa) | Yield Stress (MPa) | Yield Strain |
|---|---|---|---|---|
| Initiator-Containing Gel | 10.3 | 0.22 | 1.5 | 0.75 |
| Composite Gel 1 (graft chains-introduced composite gel) | 4.4 | 0.12 | 1.4 | 0.61 |
| BC/Gelatin Gel | 5.8 | 1.7 | 3.7 | 0.37 |

FIG. 3 confirms that the frictional coefficient μ is $10^{-1}$ or less in the measurement range, and confirms that the composite gel 1 has extremely excellent friction characteristics. In addition, it is known that the characteristic values on the horizontal axis of the stribeck curve show a specific shoulder or peak in the region of $10^0$ to $10^1$.

(Examples 2 to 5) Production of Composite Gels Having Bottle Brushes and Concentrated Polymer Brushes (Composite Gels 2 to 5)

Figure 5:
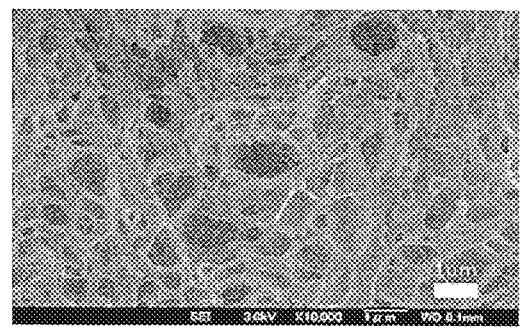
FIG. 5 is a scanning electron microscopic picture of an initiator group-containing composite gel produced in a production process for a composite gel 2, taken after freeze-drying the gel.

In the same manner as in Example 1, except that the thickness of the spacer and the amount of the raw materials used in the step (2) of producing the initiator group-containing composite gel, and the reaction time in the step (3) of introducing side chains and concentrated polymer brushes through graft polymerization were changed as in Table 4, bottle brushes and concentrated polymer brushes were given to a cellulose gel to produce composite gels 2 to 5 (graft chains-introduced composite gels). FIG. 5 shows a scanning electron microscopic picture of the initiator group-containing composite gel produced in the production step (2), taken after freeze-drying the gel (SEM picture: magnification 10000). The SEM picture of FIG. 5 confirms entangled and complexed networks of cellulose and PBIEM (main chain precursor)

TABLE 4

| Example No. | Gel No. | BIEM (part) | PEGDMA (part) | AIBN (part) | Anisole (part) | Spacer Thickness (mm) | Reaction Time (h) |
|---|---|---|---|---|---|---|---|
| Example 2 | Composite Gel 2 | 11.5 | 0.12 | 0.0034 | 26.3 | 2 | 2 |
| Example 3 | Composite Gel 3 | 11.5 | 0.12 | 0.0034 | 26.3 | 2 | 3 |
| Example 4 | Composite Gel 4 | 6 | 0.064 | 0.0019 | 17.8 | 0.5 | 3 |
| Example 5 | Composite Gel 5 | 6 | 0.061 | 0.0018 | 13.4 | 0.5 | 2 |

(Comparative Example 3) Production of Concentrated Polymer Brushes-Having Gel (Comparative Sample 3)

In the same manner as in Example 2 except that the step (2) was omitted and that the initiator group-containing gel obtained in the step (1) was used in place of the initiator group-containing composite gel in the step (3), concentrated polymer brushes were given to a cellulose gel to produce a comparative sample 3 (graft chains-introduced gel).

Figure 6:
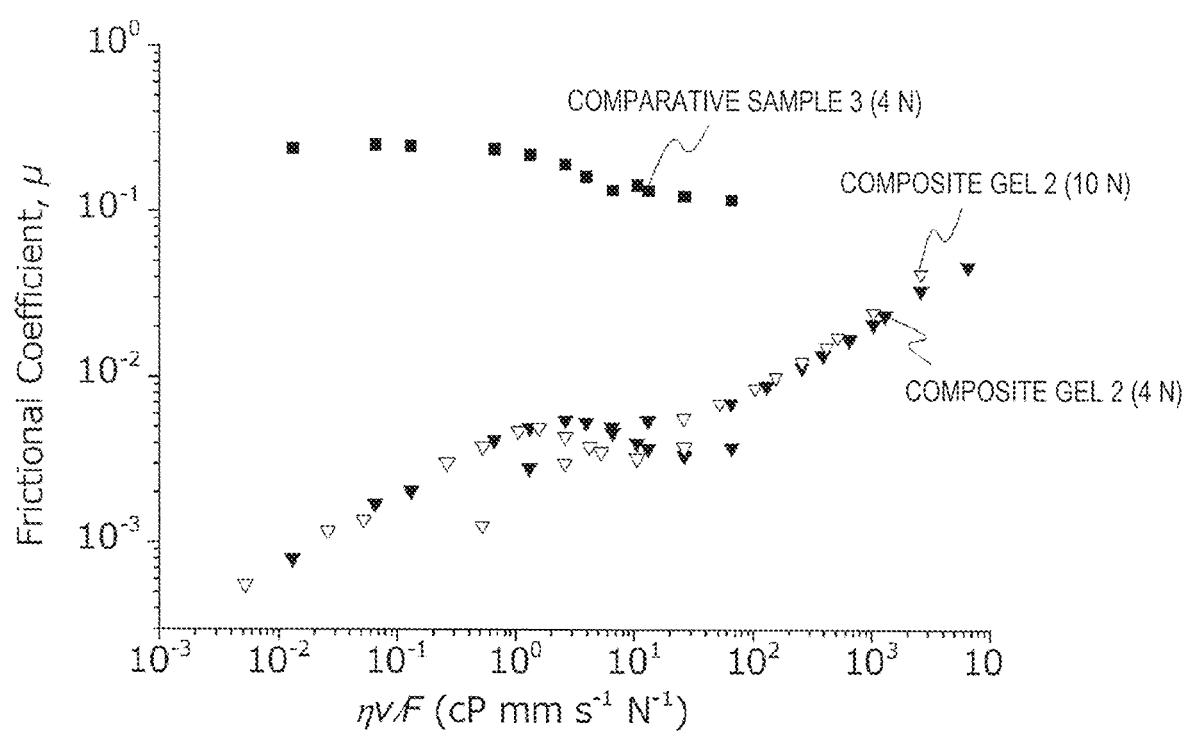
FIG. 6 is a stribeck curve of the composite gel 2 and a comparative sample 3.
Figure 7:
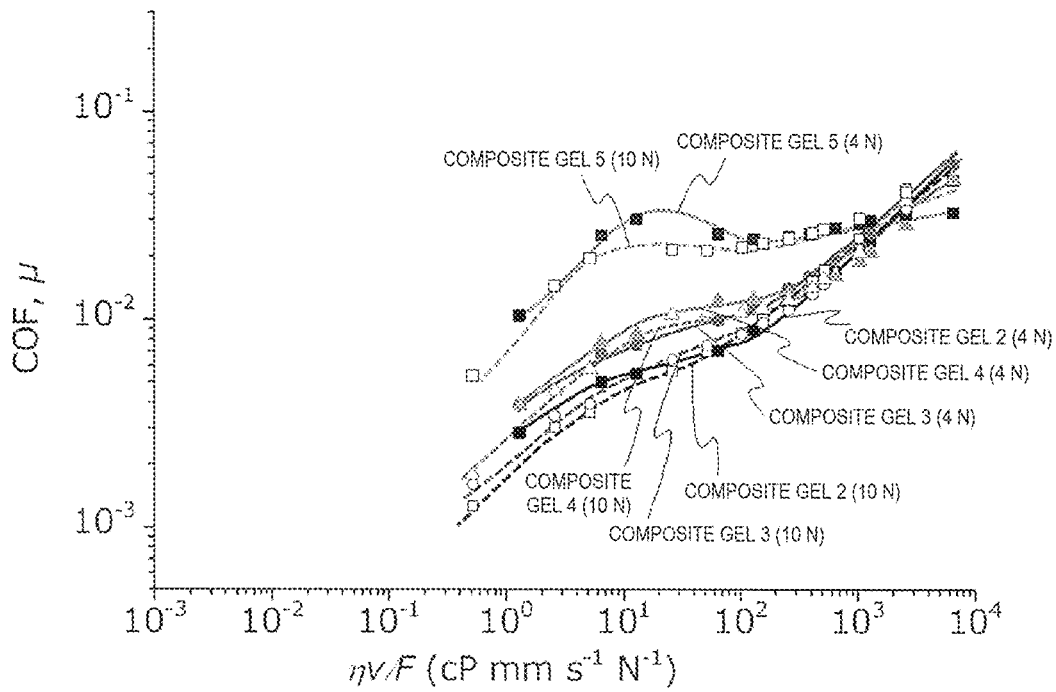
FIG. 7 is a stribeck curve of composite gels 2 to 5.
Figure 8:
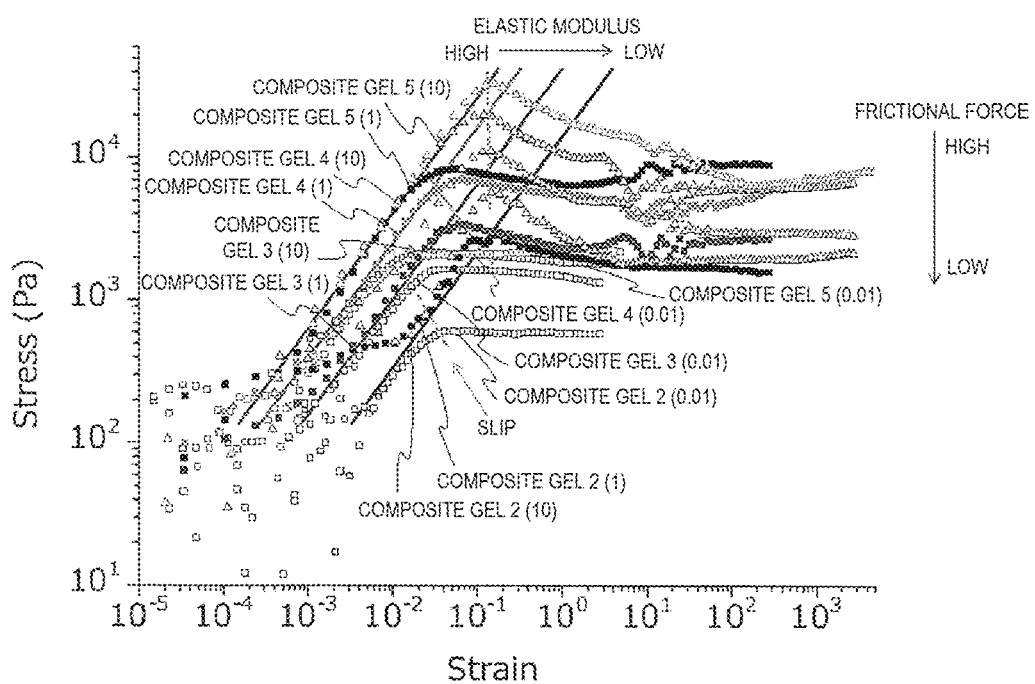
FIG. 8 is a compression stress vs strain curve of composite gels 2 to 5.
Figure 9:
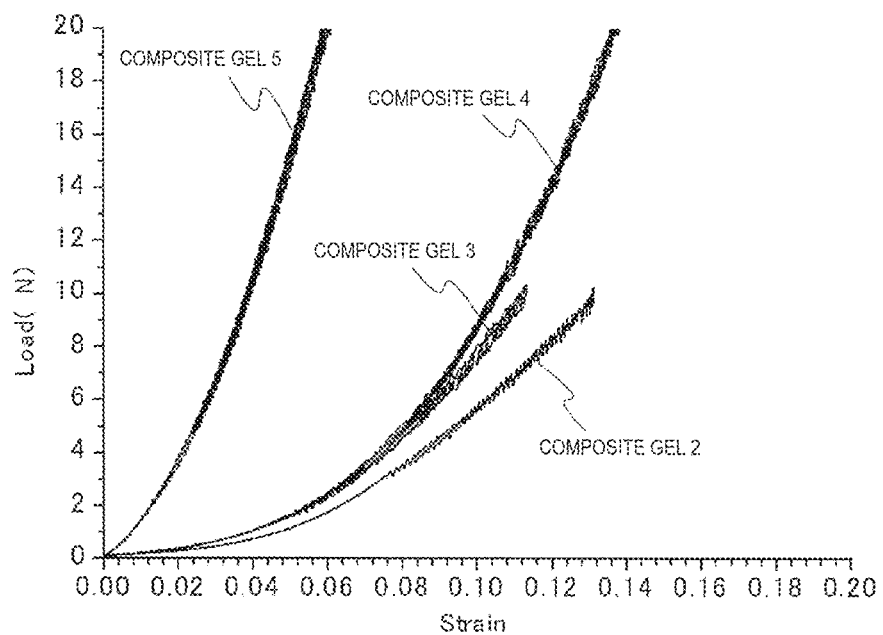
FIG. 9 is a load vs strain curve of composite gels 2 to 5.
Figure 10:
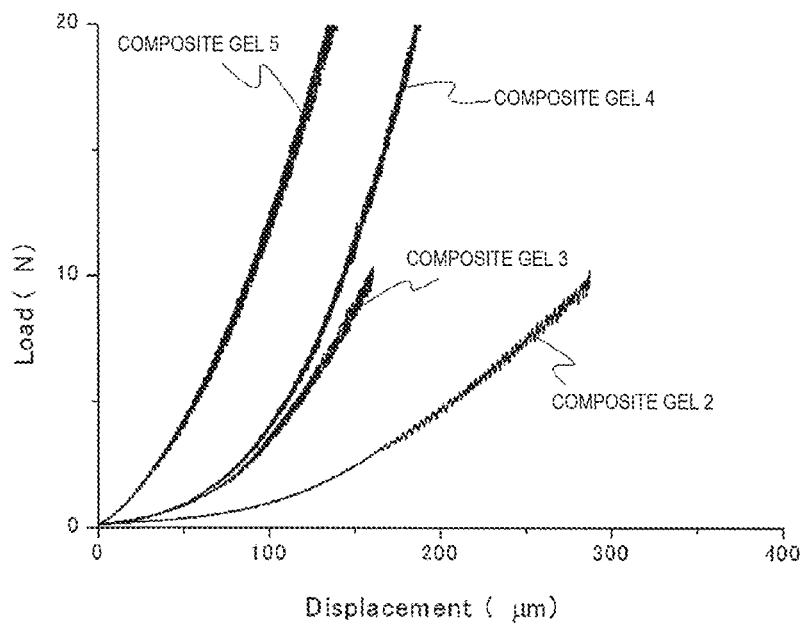
FIG. 10 is a load vs displacement curve of composite gels 2 to 5.

The produced composite gels 2 to 5 were analyzed to measure the weight ratio of the cellulose, the bottle brush main chain and the graft chains, the solid concentration, the number-average molecular weight Mn of the graft chains, the effective surface occupancy, the compressive elasticity modulus and the storage elasticity modulus G' thereof. The results are shown in Table 5. FIG. 6 shows a stribeck curve of the composite gel 2 and the comparative sample 3 measured under a load of 4 N or 10 N given thereto. FIG. 7 shows a stribeck curve of the composite gels 2 to 5 measured under a load of 4 N or 10 N given thereto. FIG. 8 shows a compression stress vs strain curve of the composite gels 2 to 5 measured at a shear strain rate of 0.01. 1 or 10; FIG. 9 shows a load vs strain curve; and FIG. 10 shows a load vs displacement curve. Here, the stribeck curve in FIG. 6 shows the data measured by infiltrating each gel with water or BMIM-Tf0; the curves in FIGS. 7 and 8 and the compressive elasticity modulus and the storage elasticity modulus G' in Table 5 each show the data measured by infiltrating each gel with BMIM-Tf0. The parenthesized numerical values in FIGS. 6 and 7 each show the load given to each gel in measurement; and the parenthesized numerical values in FIG. 8 each show the shear strain rate in measurement.

TABLE 5

| Gel No. | Composition Ratio (% by weight) | | | Solid Concentration (% by weight) | Number-Average Molecular Weight of Graft Chains, MN | Effective Surface Occupancy (%) | Compressive Elasticity Modulus (MPa) | Storage Elasticity Modulus G' (kPa) |
|---|---|---|---|---|---|---|---|---|
| | Cellulose | Bottle Brush Main Chain | Graft Chains | | | | | |
| Composite Gel 2 | 0.5 | 4.8 | 19.3 | 24.6 | 3200 | 27 | 5.5 | 46 |
| Composite Gel 3 | 0.6 | 5.4 | 19.7 | 25.7 | 5400 | 10 | 6.6 | 171 to 202 |
| Composite Gel 4 | 1.3 | 3.8 | 17.6 | 22.6 | 5400 | 12 | 7.5 | 300 to 375 |
| Composite Gel 5 | 1.1 | 6.9 | 25.0 | 33.0 | 3600 | 20 | 14 | 551 |

The swollen state shown by the stribeck curve is grouped into a liquid lubrication region where the frictional coefficient μ decreases with the reduction in the velocity V, a boundary lubrication region where the frictional coefficient μ increases with the reduction in the speed V, and a mixed lubrication region existing between the liquid lubrication region and the boundary lubrication region and showing a behavior to transfer from the liquid lubrication region to the boundary lubrication region, and among these, the liquid lubrication region exhibits an excellent friction reducing effect.

Here, as shown in FIG. 6, the cellulose gel given concentrated polymer brushes alone (comparative sample 3) showed a behavior that the frictional coefficient μ increased with the reduction in the velocity V to transfer from the mixed lubrication region to the boundary lubrication region, and showed a high frictional coefficient of an order or $10^{-1}$. As opposed to this, the cellulose gel given both bottle brushes and concentrated polymer brushes (composite gel 2) showed a behavior of the liquid lubrication region where the frictional coefficient decreases with the reduction in the velocity V, and the frictional coefficient μ thereof decreased to an order of $10^{-4}$. This is considered to be because, owing to the steric repulsive force and the non-penetrating interaction derived from the high osmotic pressure of the concentrated polymer brushes, the cohesive force of the polymer chains constituting the bottle brushes and the concentrated polymer brushes would be suppressed. From this, it is known that the gel given both bottle brushes and concentrated polymer brushes shows a more excellent friction-reducing effect than the gel given concentrated polymer brushes alone. Here, it is considered that the shoulder or the peak (region where the reduction in the frictional coefficient μ with reduction in the velocity is small) appearing in the stribeck curve would indicate the liquid resistance inside the gel observed as a frictional force and would be derived from the viscoelasticity of the gel.

As shown in FIG. 7, the composite gels 2 to 5 having both bottle brushes and concentrated polymer brushes all showed a behavior that μ decreased relative to V, and showed favorable frictional characteristics that the frictional coefficient was lower under a high load of 10 N than that under a low load of 4 N. Further, the composite gels differ from each other in the inclination of the stribeck curve and in the shape of the shoulder and the peak thereof. From this, it is known that the frictional characteristics of these gels can be controlled by changing the weight ratio of the cellulose (reinforcing filler), the bottle brush main chain and the graft chains.

The line segments shown in the compressive stress-strain curve of FIG. 8 are drawn along the elasticity deformation region of the curve measured relative to the shear strain rate of 1 (the region where stress and strain are correlated), and correspond to the composite gel 5, the composite gel 4, the composite gel 3 and the composite gel 2 in that order from the left side. The line segment existing nearer to the left side means a larger elasticity modulus. FIG. 8 shows that the composite gel 5, the composite gel 4, the composite gel 3 and the composite gel 2 have a larger frictional force derived from elastic deformation in that order.

Regarding the measurement results of the storage elasticity modulus G' shown in Table 5, the composite gels 2 and 3 having a low cellulose concentration and the composite gels 4 and 5 having a high cellulose concentration are compared with each other. It is known that the storage elasticity modulus G' of the composite gels 4 and 5 having a high cellulose concentration is larger than that of the composite gels 2 and 3 having a low cellulose concentration. In comparison between the composite gels 2 and 3 having a low cellulose concentration, and between the composite gels 4 and 5 having a high cellulose concentration, it is known that the storage elasticity modulus G' of the composite gel 3 and the composite gel 5 having a higher bottle brush main chain concentration tends to be larger than the storage elasticity modulus G' of the composite gel 2 and the composite gel 4, respectively, having a low main chain concentration. From this, it is known that the elasticity modulus of such gels can be controlled especially by changing the weight ratio of the cellulose (reinforcing filler) and the bottle brush main chain.

FIG. 9 is a load vs strain curve, and in FIG. 10, the strain on the horizontal axis in FIG. 9 was changed to displacement. As shown in FIG. 10, the indentation of the composite gels 2 to 5 was 100 nm or more. As shown in Table 5, the compressive elasticity modulus of the composite gels 2 to 5 was 1 MPa or more.

INDUSTRIAL APPLICABILITY

According to the present invention, an SRT material excellent in mechanical characteristics and low-friction performance can be realized. Accordingly, using the SRT material of the present invention, the friction in moving parts in various machine devices can be effectively reduced. Consequently, the industrial applicability of the present invention is high.

What is claimed is:
1. An organic compound having a branched polymer structure in which plural side chains are branched from a linear or crosslinked main chain and the side chains have an effective surface occupancy σ* of 1% or more represented by the following equation (1):

$$\sigma^* = \frac{1}{\left(L \times \frac{M_{n,side\ chain}}{M_{n,monomer}} + r_{main\ chain}\right)} \times \quad (1)$$

$$\frac{(W_{side\ chain} / W_{main\ chain})}{(M_{n,side\ chain} / M_{n,main\ chain})} \times \frac{A_{side\ chain}}{2\pi L}$$

(1), wherein:
- $r_{main\ chain}$ represents radius of the main chain;
- $A_{side\ chain}$ represents cross-sectional area of the side chain;
- $M_{n,\ monomer}$, $M_{n,\ side\ chain}$, and $M_{n,\ main\ chain}$ each represents molecular weight of the side chains monomer, number-average molecular weight of the side chains, and molecular weight of recurring unit in the main chain, respectively;
- $W_{side\ chain}$ and $W_{main\ chain}$ each represents weight of the side chains and weight of the main chain, respectively; and
- L represents unit length of polymer chain in the branched polymer structure, and
wherein at least one of the following (i) and (ii) is satisfied:
  (i) the side chains have a number-average polymerization degree of 5 to 20, and
  (ii) the side chains are branched from the main chain in a density of 1 chain or more per 1 nm length of the main chain.

2. A composite of the organic compound according to claim 1 and a reinforcing filler.

3. The composite according to claim 2, wherein the reinforcing filler is a cellulose nanofiber.

4. The composite according to claim 2, satisfying at least one of the following (1) and (2):
  (1) the main chains of the organic compound bond to each other via a covalent bond, an ionic bond, a hydrogen bond, a hydrophilic-lipophilic interaction or a phase separation structure,
  (2) the organic compound and any one or more of fibrous materials, nonporous inorganic materials and substances having a three-dimensional polymer network structure bond to each other via a covalent bond, an ionic bond, a hydrogen bond, a hydrophilic-lipophilic interaction or a phase separation structure.

5. The composite according to claim 2, wherein the branched polymer structure of the organic compound has an effective surface occupancy of 1% or more.

6. A method for producing a composite of the organic compound according to claim 1 and a reinforcing filler, comprising graft polymerization using a mixture of a polymer having a recurring unit having a polymerization initiator group and a reinforcing filler.

7. The method for producing a composite according to claim 6, wherein the mixture is one prepared through polymerization of a monomer having a polymerization initiator group and a reinforcing filler.

8. The method for producing a composite according to claim 6, wherein the reinforcing filler used in the mixture has a fiber network structure and the fiber network structure is maintained after the polymerization.

9. The method for producing a composite according to claim 8, wherein the reinforcing filler in the mixture is a cellulose nanofiber of a cellulose gel, and a network of the cellulose nanofiber of the cellulose gel is maintained after the polymerization.

10. A composition comprising the organic compound according to claim 1.

11. The organic compound according to claim 1, wherein the side chains have a number-average polymerization degree of 5 to 20.

12. The organic compound according to claim 1, wherein the side chains are branched from the main chain in a density of 1 chain or more per 1 nm length of the main chain.

13. The composition according to claim 10, further comprising any one or more of fibrous materials, nonporous inorganic materials and substances having a three-dimensional polymer network structure.

14. The composition according to claim 13, satisfying at least one of the following (1) and (2):
  (1) the main chains of the organic compound bond to each other via a covalent bond, an ionic bond, a hydrogen bond, a hydrophilic-lipophilic interaction or a phase separation structure,
  (2) the organic compound and the any one or more of fibrous materials, nonporous inorganic materials and substances having a three-dimensional polymer network structure bond to each other via a covalent bond, an ionic bond, a hydrogen bond, a hydrophilic-lipophilic interaction or a phase separation structure.

15. The composition according to claim 10, wherein the organic compound is present in an amount of 10% by weight or more.

16. The composition according to claim 10, further comprising a lubricating liquid.

17. The composition according to claim 10, having an indentation of 100 nm or more and a compressive elasticity modulus of 1 MPa or more.

18. The composition according to claim 10, having a frictional coefficient ($\mu$) of 0.1 or less.

19. The composition according to claim 10, which is in the form of a sheet.

20. The composition according to claim 10, which is for sliding mechanisms.

* * * * *